(12) United States Patent
Araki et al.

(10) Patent No.: US 8,492,450 B2
(45) Date of Patent: Jul. 23, 2013

(54) SILOXANE RESIN COMPOSITION AND PROTECTIVE FILM FOR TOUCH PANEL USING THE SAME

(75) Inventors: Hitoshi Araki, Otsu (JP); Mitsuhito Suwa, Otsu (JP)

(73) Assignee: Toray Industries, Inc., Tokyo (JP)

( * ) Notice: Subject to any disclaimer, the term of this patent is extended or adjusted under 35 U.S.C. 154(b) by 53 days.

(21) Appl. No.: 13/130,843

(22) PCT Filed: Nov. 16, 2009

(86) PCT No.: PCT/JP2009/069421
§ 371 (c)(1),
(2), (4) Date: May 24, 2011

(87) PCT Pub. No.: WO2010/061744
PCT Pub. Date: Jun. 3, 2010

(65) Prior Publication Data
US 2011/0230584 A1  Sep. 22, 2011

(30) Foreign Application Priority Data
Nov. 27, 2008  (JP) .................. 2008-302277

(51) Int. Cl.
C09D 5/44 (2006.01)
G03F 7/031 (2006.01)
C08B 37/00 (2006.01)
C08F 2/50 (2006.01)
H05B 6/68 (2006.01)
B29C 71/04 (2006.01)

(52) U.S. Cl.
USPC ............ 522/9; 522/8; 522/7; 522/6; 522/1; 522/71; 522/68

(58) Field of Classification Search
USPC .................. 522/9, 8, 7, 6, 1, 71, 68
See application file for complete search history.

(56) References Cited

FOREIGN PATENT DOCUMENTS

| | | |
|---|---|---|
| JP | 9048950 | 2/1997 |
| JP | 2000017028 | 1/2000 |
| JP | 2001330707 | 11/2001 |
| JP | 2003227949 | 8/2003 |
| JP | 2005036018 | 2/2005 |
| JP | 2006348196 | 12/2006 |
| JP | 2007-091870 | * 4/2007 |
| JP | 2007277332 | 10/2007 |
| JP | 2007279819 | 10/2007 |
| JP | 2008208342 | 9/2008 |
| WO | WO 2006-112234 | * 10/2006 |

OTHER PUBLICATIONS

Ohara Noboru et al., "Material design coating technique and hardness improvement in hard coating film on plastic substrate", Technical Information Institute Co., Ltd., Apr. 28, 2005, p. 301.
International Search Report for PCT/JP2009/069421 dated Feb. 16, 2010.

* cited by examiner

*Primary Examiner* — Ling Choi
*Assistant Examiner* — Jessica E Whiteley
(74) *Attorney, Agent, or Firm* — RatnerPrestia

(57) ABSTRACT

A siloxane resin composition is provided which is superior in pattern processability and yields a cured film with high hardness and excellent abrasion resistance by means of UV curing and thermal curing. The siloxane resin composition includes (A) polysiloxane having a carboxyl group and a radical polymerizable group, (B) a photo-radical polymerization initiator and (C) a compound having a radical polymerizable group and not having a Si—O—Si bond.

10 Claims, No Drawings

SILOXANE RESIN COMPOSITION AND PROTECTIVE FILM FOR TOUCH PANEL USING THE SAME

TECHNICAL FIELD

The present invention relates to a siloxane resin composition and a protective film for a touch panel using the same.

BACKGROUND ART

Currently, applications of hard coating materials are wide-ranging, and the hard coating materials are used, for example, for improving surface hardness of automobile parts, containers for cosmetics and the like, sheets, films, optical discs, and flat displays. Examples of characteristics required for the hard coating materials include hardness, abrasion resistance, heat resistance, weather resistance, and adhesion. Typical examples of the hard coat materials include radical polymerizable and UV-curable hard coatings (e.g., refer to Non-patent Document 1), and their constituents are a polymerizable group-containing oligomer, a monomer, a photopolymerization initiator and other additives. The oligomer and the monomer are radically polymerized and thus cross-linked by UV irradiation to yield a film with high hardness. This hard coat material has advantages that the time required to be cured is short to improve the productivity and that a negative type photosensitive material based on a general radical polymerization mechanism can be used to reduce a production cost. However, this hard coating material had a problem that since it contains a large amount of organic components, it has less hardness and abrasion resistance than other hard coating materials and therefore it generates cracks resulting from volume shrinkage due to UV-curing.

A touch panel is one of the principal uses of the hard coating materials. Resistance film type touch panels, which are currently the mainstream, cannot be subjected to a high-temperature treatment since a sensor is mounted on the film of the touch panel. Accordingly, the above-mentioned UV-curable hard coatings, which do not require thermal curing or can attain a cured film by low-temperature curing, have been preferably used (e.g., refer to Patent Document 1). On the other hand, in the case of capacitance type touch panels which receive attention in recent years, it is possible to form a transparent ITO (indium tin oxide) film in which crystallization is sufficiently developed since the ITO film is formed on a glass which can be treated at elevated temperatures. On the other hand, since this touch panel does not have such a layer as to function to mitigate external impact that the resistance film type touch panels have, higher hardness is required for the surface protective film of this touch panel. For this situation, for example, there is disclosed a capacitance type touch panel which uses glass with an ITO film as a substrate and has a protective film composed of inorganic $SiO_2$ or SiNx with high hardness, or a transparent resin (e.g., refer to Patent Document 2). However, inorganic hard coatings have a problem that production cost is high since the inorganic hard coatings are formed by forming a film of $SiO_2$ or SiNx at elevated temperatures by CVD (Chemical Vapor Deposition) or formed by performing a high-temperature treatment close to 300° C. for a long time after coating SOG (spin on glass) and therefore energy consumption increases, and moreover a protective film is processed for the purpose of connecting a circuit and therefore the number of processes increases. Therefore, photosensitive hard coat materials with high hardness, which are superior in abrasion resistance and capable of pattern processing, are required.

On the other hand, as a UV-curable coating composition, a composition including (A) metal oxide colloid sol, (B) a hydrolysis-condensation product of alkoxysilane which at least partially contains a specific organic functional group and has a controlled molecular weight distribution, and (C) a photopolymerization initiator are known (e.g., refer to Patent Document 3). However, these do not have pattern processability and therefore these are not sufficient for being applied as a protective film for a touch panel. Further, a photocurable organopolysiloxane composition, which contains (meth) acryloyloxy group-containing organopolysiloxane and a photosensitizer, is disclosed (e.g., refer to Patent Document 4). However, a developer of such a composition is restricted to an organic solvent and the composition is not suitable for a manufacturing process of a touch panel. Further, there is disclosed a resin composition which includes polysiloxane prepared by hydrolyzing and condensing phenyltrialkoxysilane and dicarboxylic anhydride group-containing alkoxysilane, a compound containing a double bond and/or a triple bond, a photopolymerization initiator, and a solvent (e.g., refer to Patent Document 5). However, the hardness and the abrasion resistance of such a composition were insufficient for applying the composition as a hard coating material.

PATENT DOCUMENTS

Patent Document 1: Japanese Unexamined Patent Publication No. 2001-330707
Patent Document 2: Japanese Unexamined Patent Publication No. 2007-279819
Patent Document 3: Japanese Unexamined Patent Publication No. 2007-277332
Patent Document 4: Japanese Unexamined Patent Publication No. 2003-227949
Patent Document 5: Japanese Unexamined Patent Publication No. 2008-208342

NON-PATENT DOCUMENT

Non-Patent Document 1: Ohara Noboru et al., "Material design●coating technique and hardness improvement in hard coating film on plastic substrate", Technical Information Institute Co., Ltd., Apr. 28, 2005, p 301

SUMMARY OF THE INVENTION

The present invention provides a siloxane resin composition which is superior in pattern processability and yields a cured film with high hardness and excellent abrasion resistance by means of UV curing and thermal curing.

According to an exemplary embodiment, the present invention pertains to a siloxane resin composition characterized by including (A) polysiloxane having a carboxyl group and a radical polymerizable group, (B) a photo-radical polymerization initiator and (C) a compound having a radical polymerizable group and not having a Si—O—Si bond.

The siloxane resin composition is superior in pattern processability and can yield a cured film with high hardness and excellent abrasion resistance by means of UV curing and thermal curing.

DETAILED DESCRIPTION OF THE INVENTION

The siloxane resin composition according to an exemplary embodiment of the present invention includes (A) polysiloxane having a carboxyl group and a radical polymerizable group, (B) a photo-radical polymerization initiator and (C) a compound having a radical polymerizable group and not having a Si—O—Si bond.

The siloxane resin composition includes (A) polysiloxane having a carboxyl group and a radical polymerizable group. By having the carboxyl group in the polysiloxane, alkali-solubility (developing property) is improved to inhibit development residue and therefore it becomes possible to form a good pattern. Further, by having the radical polymerizable group, a crosslinking reaction between (C) the compound having a radical polymerizable group and not having a Si—O—Si bond and (A) the polysiloxane occurs and a crosslinking density of the resulting cured film is increased, and therefore the hardness of a cured film can be outstandingly improved. Further, since a film can be cured with a small amount of light irradiation, the sensitivity of the siloxane resin composition can be improved. Moreover, by having the radical polymerizable group and the carboxyl group in one polymer, crosslinking can be uniformly developed and the abrasion resistance of the resulting cured film is improved. The siloxane resin composition may include two or more of these polysiloxanes.

The content of a carboxyl group in (A) the polysiloxane having a carboxyl group and a radical polymerizable group is preferably 0.05 mole or more with respect to 1 mole of a Si atom, and when the content is in this range, development residue can be reduced and the crack resistance of a cured film can be improved. The content is more preferably 0.1 mole or more. Further, the content of the carboxyl group is preferably 0.8 mole or less, and when the content is in this range, the hardness of a cured film can be more improved. The content is more preferably 0.5 mole or less. Further, when the siloxane resin composition includes two or more types of (A) the polysiloxanes, it is preferable that the content of the carboxyl group of at least one (A) the polysiloxane is in the above-mentioned range.

The content of the carboxyl group in the polysiloxane can be determined, for example, by measuring a $^{29}$Si-nuclear magnetic resonance spectrum of polysiloxane and calculating a ratio of the peak area of Si to which the carboxyl group is coupled to the peak area of Si to which the carboxyl group is not coupled. Further, when the carboxyl group is not directly coupled to Si, the content of the carboxyl group of the whole polysiloxane is determined by calculating a ratio of a value of integral of a peak from the carboxyl group to a value of integral of a peak from other groups excluding a silanol group from $^1$H-nuclear magnetic resonance spectrum, and the content of the carboxyl group which is indirectly coupled to Si is determined by combining the content of the carboxyl group of the whole polysiloxane with the result of the $^{29}$Si-nuclear magnetic resonance spectrum. In addition to this, the content of the carboxyl group can also be calculated by calculating a ratio of the carboxyl group to the silane group from the $^1$H-nuclear magnetic resonance spectrum, and then measuring an acid value.

The content of a radical polymerizable group in (A) the polysiloxane having a carboxyl group and a radical polymerizable group is preferably 0.05 mole or more, and more preferably 0.1 mole or more with respect to 1 mole of a Si atom. Further, the content of the radical polymerizable group is preferably 0.8 mole or less, and more preferably 0.6 mole or less. When the content is in this range, a cured film, which achieves hardness, abrasion resistance and crack resistance simultaneously at a higher level, is obtained. Further, when the siloxane resin composition includes two or more types of (A) the polysiloxanes, it is preferable that the content of the radical polymerizable group of at least one (A) the polysiloxanes is in the above-mentioned range.

The content of the radical polymerizable group in the polysiloxane can be calculated, for example, by performing thermogravimetric analysis (TGA) of the resulting polymer up to 900° C. in the atmosphere, confirming that an ash content is SiO$_2$ by infrared absorption analysis, calculating the number of moles of silicon atoms per 1 g of a polymer from a weight loss rate of a polymer, and then measuring an iodine value.

A weight average molecular weight (Mw) of (A) the polysiloxane having a carboxyl group and a radical polymerizable group, which is used in the siloxane resin composition, is not particularly limited, but the weight average molecular weight is preferably 1000 or more, and more preferably 2000 or more on the polystyrene equivalent basis measured by gel permeation chromatography (GPC). Further, the weight average molecular weight is preferably 100000 or less, and more preferably 50000 or less. When the Mw is in the above range, a good application property is achieved and the solubility of the composition in a developer upon patterning is also excellent.

Whether (A) the polysiloxane having a carboxyl group and a radical polymerizable group, which is used in the siloxane resin composition, has a carboxyl group and a radical polymerizable group in one molecule or not is determined depending on whether a single peak can be obtained by GPC and normal phase distribution chromatography or not. In the case of combination of polymers having different polarities, even though the single peak can be obtained in GPC, a plurality of peaks is found in normal phase distribution chromatography.

In the siloxane resin composition, the content of (A) the polysiloxane having a carboxyl group and a radical polymerizable group is not particularly limited and any content can be selected according to a desired film thickness or use, but the content is generally 0.1 to 80% by weight of the siloxane resin composition. Further, the content is preferably 10% by weight or more of the solid content.

(A) the polysiloxane having a carboxyl group and a radical polymerizable group, which is used in the siloxane resin composition, is obtained, for example, by hydrolyzing organosilane compounds containing an organosilane compound having a carboxyl group and/or a dicarboxylic anhydride group, and an organosilane compound having a radical polymerizable group in the presence of metal compound particles described later, and condensing a hydrolysate.

The organosilane compound, which composes (A) the polysiloxane, having a carboxyl group and/or a dicarboxylic anhydride group will be described specifically.

Examples of the organosilane compound having a carboxyl group include a urea group-containing organosilane compound represented by the following general formula (2) and a urethane group-containing organosilane compound represented by the following general formula (3). Two or more thereof may be used.

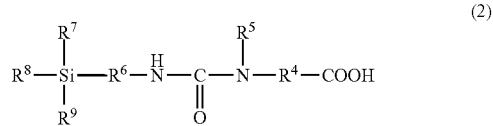

-continued

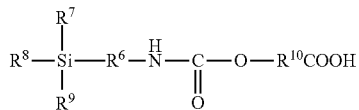
(3)

In the above formula, $R^4$, $R^6$ and $R^{10}$ represent each a divalent organic group having 1 to 20 carbon atoms. $R^5$ represents a hydrogen atom or an alkyl group having 1 to 3 carbon atoms. $R^7$ to $R^9$ represent each an alkyl group having 1 to 6 carbon atoms, an alkoxy group having 1 to 6 carbon atoms, a phenyl group, a phenoxy group, an alkylcarbonyloxy group having 2 to 6 carbon atoms, or substitution products thereof. However, at least one of $R^7$ to $R^9$ is an alkoxy group, a phenoxy group or an acetoxy group.

Preferable examples of $R^4$ and $R^{10}$ in the general formulas (2) and (3) include hydrocarbon groups such as a methylene group, an ethylene group, a n-propylene group, a n-butylene group, a phenylene group, —$CH_2$—$C_6H_4$—$CH_2$—, and —$CH_2$—$C_6H_4$—. Among these, the hydrocarbon groups having an aromatic ring such as a phenylene group, —$CH_2$—$C_6H_4$—$CH_2$— and —$CH_2$—$C_6H_4$— are preferable from the viewpoint of heat resistance.

$R^5$ in the above general formula (2) is preferably a hydrogen atom or a methyl group from the viewpoint of reactivity.

Specific examples of $R^6$ in the general formulas (2) and (3) include hydrocarbon groups such as a methylene group, an ethylene group, a n-propylene group, a n-butylene group and a pentylene group, an oxymethylene group, an oxyethylene group, an oxy-n-propylene group, an oxy-n-butylene group, and an oxy-n-pentylene group. Among these, a methylene group, an ethylene group, a n-propylene group, a n-butylene group, an oxymethylene group, an oxyethylene group, an oxy-n-propylene group, and an oxy-n-butylene group are preferable from the viewpoint of ease of synthesis.

Specific examples of alkyl groups of $R^7$ to $R^9$ in the general formulas (2) and (3) include a methyl group, an ethyl group, a n-propyl group, and an isopropyl group. From the viewpoint of ease of synthesis, a methyl group and an ethyl group are preferable. Further, specific examples of the alkoxy group include a methoxy group, an ethoxy group, a n-propoxy group, and an isopropoxy group. From the viewpoint of ease of synthesis, a methoxy group and an ethoxy group are preferable. Further, examples of the substituent of the substitution products include a methoxy group and an ethoxy group. Specific examples thereof include a 1-methoxypropyl group and a methoxyethoxy group.

The urea group-containing organosilane compound represented by the above general formula (2) can be obtained from an aminocarboxylic compound represented by the following general formula (4) and an isocyanate group-containing organosilane compound represented by the following general formula (6) by a known urea-forming reaction. Further, the urethane group-containing organosilane compound represented by the above general formula (3) can be obtained from a hydroxycarboxylic compound represented by the following general formula (5) and an isocyanate group-containing organosilane compound represented by the following general formula (6) by a known urethanization reaction.

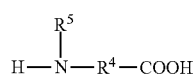
(4)

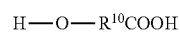
(5)

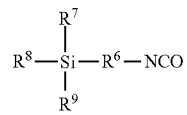
(6)

In the above formula, $R^4$, $R^6$ and $R^{10}$ represent each a divalent organic group having 1 to 20 carbon atoms. $R^5$ represents a hydrogen atom or an alkyl group having 1 to 3 carbon atoms. $R^7$ to $R^9$ represent each an alkyl group having 1 to 6 carbon atoms, an alkoxy group having 1 to 6 carbon atoms, a phenyl group, a phenoxy group, an alkylcarbonyloxy group having 2 to 6 carbon atoms, or substitution products thereof. However, at least one of $R^7$ to $R^9$ is an alkoxy group, a phenoxy group or an acetoxy group. Preferable examples of $R^4$ to $R^{10}$ are as previously described in the groups of $R^4$ to $R^{10}$ in the general formulas (2) and (3).

Other specific examples of the organosilane compound having a carboxyl group include a compound represented by the following general formula (7).

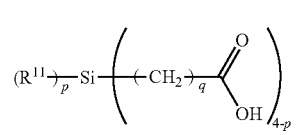
(7)

In the above formula, $R^{11}$s represent each an alkyl group having 1 to 6 carbon atoms, an alkoxy group having 1 to 6 carbon atoms, a phenyl group, a phenoxy group, an alkylcarbonyloxy group having 2 to 6 carbon atoms, or substitution products thereof. However, the plural $R^{11}$s may be the same or different and at least one of $R^{11}$s is an alkoxy group, a phenoxy group or an acetoxy group. P represents an integer of 1 to 3 and q represents an integer of 2 to 20.

Specific examples of the organosilane compound having a dicarboxylic anhydride group include an organosilane compound represented by any one of the following general formulas (8) to (10), and two or more types of these compounds may be used.

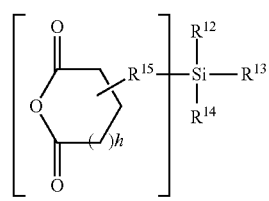
(8)

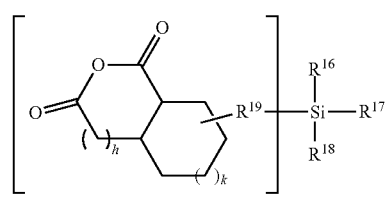
(9)

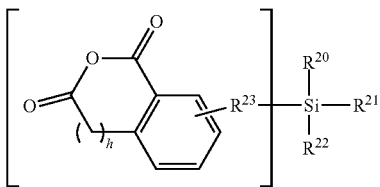

In the above formula, $R^{12}$ to $R^{14}$, $R^{16}$ to $R^{18}$, and $R^{20}$ to $R^{22}$ represent each an alkyl group having 1 to 6 carbon atoms, an alkoxy group having 1 to 6 carbon atoms, a phenyl group, a phenoxy group, an alkylcarbonyloxy group having 2 to 6 carbon atoms, or substitution products thereof. $R^{15}$, $R^{19}$ and $R^{23}$ represent each a single bond or a chain aliphatic hydrocarbon group, a cyclic aliphatic hydrocarbon group, a carbonyl group, an ether group, an ester group, an amide group, an aromatic group, or a divalent group having any thereof. These groups may be substituted. h and l represent each an integer of 0 to 3.

Specific examples of $R^{15}$, $R^{19}$ and $R^{23}$ include —$C_2H_4$—, —$C_3H_6$—, —$C_4H_8$—, —O—, —$C_3H_6OCH_2CH(OH)CH_2O_2C$—, —CO—, —$CO_2$—, —CONH—, and groups described below.

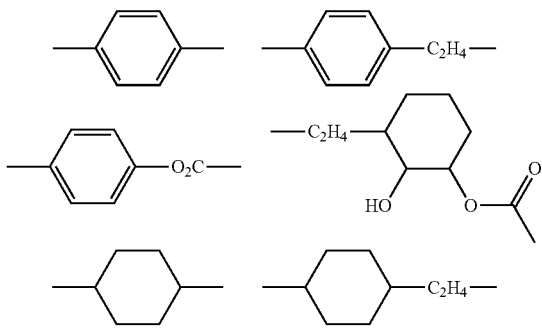

Specific examples of the organosilane compound represented by the general formula (8) include 3-trimethoxysilylpropylsuccinic anhydride, 3-triethoxysilylpropylsuccinic anhydride, and 3-triphenoxysilylpropylsuccinic anhydride. Specific examples of the organosilane compounds represented by the general formula (9) include 3-(trimethoxysilyl) propyl cyclohexyl dicarboxylic anhydride. Specific examples of the organosilane compound represented by the general formula (10) include 3-(trimethoxysilyl)propyl phthalic anhydride.

Examples of the radical polymerizable group of the organosilane compound having a radical polymerizable group include a vinyl group, an α-methylvinyl group, an allyl group, a styryl group, and a (meth)acryloyl group. Among these, the (meth)acryloyl group is preferable. By selecting the (meth)acryloyl group, the hardness of a cured film and the sensitivity during pattern processing can be more improved. The (meth) acryloyl group refers to a methacryloyl group or an acryloyl group.

Specific examples of the organosilane compound having a radical polymerizable group include vinyltrimethoxysilane, vinyltriethoxysilane, vinyltri(methoxyethoxy)silane, vinylmethyldimethoxysilane, vinylmethyldiethoxysilane, vinylmethyldi(methoxyethoxy)silane, allyltrimethoxysilane, allyltriethoxysilane, allyltri(methoxyethoxy)silane, allylmethyldimethoxysilane, allylmethyldiethoxysilane, allylmethyldi(methoxyethoxy)silane, styryltrimethoxysilane, styryltriethoxysilane, styryltri(methoxyethoxy)silane, styrylmethyldimethoxysilane, styrylmethyldiethoxysilane, styrylmethyldi(methoxyethoxy)silane, γ-acryloylpropyltrimethoxysilane, γ-acryloylpropyltriethoxysilane, γ-acryloylpropyltri(methoxyethoxy)silane, γ-methacryloylpropyltrimethoxysilane, γ-methacryloylpropyltriethoxysilane, γ-methacryloylpropyltri(methoxyethoxy)silane, γ-methacryloylpropylmethyldimethoxysilane, γ-methacryloylpropylmethyldiethoxysilane, γ-acryloylpropylmethyldimethoxysilane, γ-acryloylpropylmethyldiethoxysilane, and γ-methacryloylpropyl(methoxyethoxy)silane. Two or more thereof may be used. Among these, γ-acryloylpropyltrimethoxysilane, γ-acryloylpropyltriethoxysilane, γ-methacryloylpropyltrimethoxysilane, and γ-methacryloylpropyltriethoxysilane are preferable from the viewpoint of more improvements in the hardness of a cured film and the sensitivity during pattern processing.

When (A) the polysiloxane having a carboxyl group and a radical polymerizable group, which is used in the siloxane resin composition, is obtained by hydrolyzing organosilane compounds containing an organosilane compound having a carboxyl group and/or a dicarboxylic anhydride group and an organosilane compound having a radical polymerizable group in the presence of metal compound particles described later, and condensing a hydrolysate, the hardness, the abrasion resistance and the cracking resistance of a cured film are more improved. It is thought that these improvements are achieved since by conducting the polymerization of polysiloxane in the presence of metal compound particles, a chemical bond (covalent bond) to the metal compound particle is formed in at least apart of the polysiloxane and the metal compound particles are uniformly dispersed to improve the storage stability of an applying solution and the uniformity of a cured film. Further, a refractive index of the resulting cured film can be adjusted by selecting the type of the metal compound particle. In addition, as the metal compound particle, (D) metal compound particles exemplified described later can be employed.

(A) the polysiloxane having a carboxyl group and a radical polymerizable group, which is used in the siloxane resin composition, may contain fluorine. The abrasion resistance of a cured film is more improved by containing fluorine. The polysiloxane containing fluorine is obtained by hydrolyzing organosilane compounds containing an organosilane compound having fluorine, and condensing a hydrolysate. Since the polysiloxane, (A) the component in the present invention, has a carboxyl group and a radical polymerizable group, it is preferably prepared by hydrolyzing an organosilane compound having a carboxyl group and/or a dicarboxylic anhydride group, an organosilane compound having a radical polymerizable group, an organosilane compound having fluorine and other organosilane compounds to be added as required, and condensing a hydrolysate. Specific examples of the organosilane compound having fluorine include trifluoromethyltrimethoxysilane, trifluoromethyltriethoxysilane, trifluoropropyltrimethoxysilane, trifluoropropyltriethoxysilane, perfluoropropyltrimethoxysilane, perfluoropropyltriethoxysilane, perfluoropentyltrimethoxysilane, perfluoropentyltriethoxysilane, tridecafluorooctyltrimethoxysilane, tridecafluorooctyltriethoxysilan, tridecafluorooctyltripropoxysilane, tridecafluorooctyltriisopropoxysilane, heptadecafluorodecyltrimethoxysilane, heptadecafluorodecyltriethoxysilane, bis(trifluoromethyl)dimethoxysilane, bis(trifluoropropyl)dimethoxysilane, bis(trifluoropropyl)diethoxysilane, trifluoropropylmethyldimethoxysilane, trifluoropropylmethyldiethoxysilane, trifluoropropylethyldimethoxysilane, trifluoropropylethyldiethoxysilane, and heptadecafluorodecylmethyldimethoxysilane. Two or more thereof may be used. Among these, trifluoropropyltrimethoxysilane, trifluoropropyltriethoxysilane, tridecafluorooctyltrimethoxysilane, and tridecafluorooctyltriethoxysilane are particularly preferably used.

(A) the polysiloxane having a carboxyl group and a radical polymerizable group, which is used in the siloxane resin composition, may be synthesized by using other organosilane compounds in addition to the above-mentioned organosilane compounds. Specific examples of other organosilane compounds include methyltrimethoxysilane, methyltriethoxysilane, methyltri(methoxyethoxy)silane, methyltripropoxysilane, methyltriisopropoxysilane, methyltributhoxysilane, ethyltrimethoxysilane, ethyltriethoxysilane, hexyltrimethoxysilane, octadecyltrimethoxysilane, octadecyltriethoxysilane, 3-aminopropyltriethoxysilane, N-(2-aminoethyl)-3-aminopropyltrimethoxysilane, 3-chloropropyltrimethoxysilane, 3-(N,N-glydicyl)aminopropyltrimethoxysilane, 3-glycidoxypropyltrimethoxysilane, γ-aminopropyltrimethoxysilane, γ-aminopropyltriethoxysilane, N-β-(aminoethyl)-γ-aminopropyltrimethoxysilane, β-cyanoethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltriisopropoxysilane, γ-glycidoxypropyltributoxysilane, γ-glycidoxypropyltri(methoxyethoxy)silane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, 2-(3,4-epoxycyclohexyl)ethyltripropoxysilane, 2-(3,4-epoxycyclohexyl)ethyltributoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyltriphenoxysilane, 3-(3,4-epoxycyclohexyl)propyltrimethoxysilane, 3-(3,4-epoxycyclohexyl)propyltriethoxysilane, 4-(3,4-epoxycyclohexyl)butyltrimethoxysilane, 4-(3,4-epoxycyclohexyl)butyltriethoxysilane, dimethyldimethoxysilane, dimethyldiethoxysilane, γ-glycidoxypropylmethyldimethoxysilane, γ-aminopropylmethyldimethoxysilane, γ-aminopropylmethyldiethoxysilane, N-(2-aminoethyl)-3-aminopropylmethyldimethoxysilane, glycidoxymethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, β-glycidoxypropylmethyldibutoxysilane, γ-glycidoxypropylmethyldi(methoxyethoxy)silane, γ-glycidoxypropylethyldimethoxysilane, γ-glycidoxypropylethyldiethoxysilane, 3-chloropropylmethyldimethoxysilane, 3-chloropropylmethyldiethoxysilane, cyclohexylmethyldimethoxysilane, octadecylmethyldimethoxysilane, tetramethoxysilane, and tetraethoxysilane. Two or more thereof may be used.

(A) the polysiloxane having a carboxyl group and a radical polymerizable group, which is used in the siloxane resin composition, can be obtained by hydrolyzing the organosilane compound, and condensing the hydrolysate in the presence of a solvent or without using a solvent.

Various conditions of the hydrolysis reaction such as an acid concentration, a reaction temperature and a reaction time can be appropriately set in consideration of, for example, a reaction scale, a reaction container size, and a reaction container shape, and it is preferable, for example, that in a solvent, an acid catalyst and water are added to the organosilane compound over 1 to 180 minutes and then the organosilane compound is reacted at room temperature to 110° C. for 1 to 180 minutes. By carrying out the hydrolysis reaction in such conditions, a rapid reaction can be suppressed. The reaction temperature is more preferably 30 to 105° C.

The hydrolysis reaction is preferably carried out in the presence of an acid catalyst. An acid aqueous solution containing formic acid, acetic acid or phosphoric acid is preferably employed as an acid catalyst. Preferable contents of these acid catalysts are 0.1 to 5 parts by weight with respect to 100 parts by weight of the whole organosilane compounds which are used during the hydrolysis reaction. By adjusting the amount of the acid catalyst to fall within the above range, it is possible to easily control the hydrolysis reaction for a necessary and sufficient progress of the hydrolysis reaction.

It is preferable that after obtaining a silanol compound by the hydrolysis reaction of the organosilane compound, a reaction solution is heated as it is at a temperature of 50° C. or higher and a boiling point or lower of a solvent for 1 to 100 hours to perform a condensation reaction. Further, in order to increase a polymerization degree of the polysiloxane, the organosilane compound may be reheated, or a basic catalyst may be added.

The solvent, which is used for the hydrolysis reaction of the organosilane compound and the condensation reaction of the hydrolysate, is not particularly limited and can be appropriately selected in consideration of stability, wettability and volatility of the resin composition. Further, the solvent may be used for the reaction in combination of two or more species, or the reaction may be carried out without a solvent. Specific examples of the solvent include alcohols such as methanol, ethanol, propanol, isopropanol, butanol, isobutanol, t-butanol, pentanol, 4-methyl-2-pentanol, 3-methyl-2-butanol, 3-methyl-3-methoxy-1-butanol, 1-t-butoxy-2-propanol and diacetone alcohol; glycols such as ethylene glycol and propylene glycol; ethers such as ethylene glycol monomethyl ether, ethylene glycol monoethyl ether, propylene glycol monomethyl ether, propylene glycol monoethyl ether, propylene glycol monopropyl ether, propylene glycol monobutyl ether, ethylene glycol dimethyl ether, ethylene glycol diethyl ether, ethylene glycol dibutyl ether and diethyl ether; ketones such as methyl ethyl ketone, acetylacetone, methyl propyl ketone, methyl butyl ketone, methyl isobutyl ketone, diisobutyl ketone, cyclopentanone and 2-heptanone; amides such as dimethylformamide and dimethylacetamide; acetates such as ethyl acetate, propyl acetate, butyl acetate, isobutyl acetate, ethylene glycol monoethyl ether acetate, propylene glycol monomethyl ether acetate, 3-methoxybutyl acetate, 3-methyl-3-methoxybutyl acetate, methyl lactate, ethyl lactate and butyl lactate; aromatic or aliphatic hydrocarbons such as toluene, xylene, hexane and cyclohexane; γ-butyrolactone, N-methyl-2-pyrrolidone and dimethyl sulfoxide. From the viewpoint of transmittance and cracking resistance of a cured film, diacetone alcohol, propylene glycol monomethyl ether, propylene glycol monomethyl ether acetate, propylene glycol monoethyl ether, propylene glycol mono-t-butyl ether, propylene glycol monopropyl ether, propylene glycol monobutyl ether and γ-butyrolactone are preferably used.

When a solvent is produced by the hydrolysis reaction, it is also possible to perform hydrolysis without a solvent. It is also preferable to adjust the concentration of the resin composition to a proper concentration by further adding the solvent after the completion of the reaction. Further, in accordance with the purpose, an appropriate amount of alcohol produced may be distilled and removed by heating and/or under a reduced pressure after hydrolysis and thereafter a suitable solvent may be added.

The amount of the solvent used in the hydrolysis reaction is preferably 80 parts by weight or more and 500 parts by weight or less with respect to 100 parts by weight of the whole organosilane compound. By adjusting the amount of the solvent to fall within the above range, it is possible to easily control the hydrolysis reaction for a necessary and sufficient progress.

Further, water to be used for the hydrolysis reaction is preferably ion-exchange water. The amount of the water can be optionally selected, but it is preferable to use water of the range of 1.0 to 4.0 mole per 1 mol of a silane atom.

The siloxane resin composition includes (B) a photo-radical polymerization initiator. Any photo-radical polymerization initiator may be used as long as it is decomposed and/or reacts by light (including ultraviolet ray and an electron beam) to generate a radical. Specific examples of the photo-radical polymerization initiator include 2-methyl-[4-(methylthio)phenyl]-2-morpholinopropane-1-one, 2-dimethylamino-2-(4-methylbenzyl)-1-(4-morpholine-4-yl-phenyl)-butan-1-one, 2-benzyl-2-dimethylamino-1-(4-morpholinophenyl)-butanone-1,2,4,6-trimethylbenzoylphenylphosphine oxide, bis(2,4,6-trimethylbenzoyl)-phenylphosphine oxide, bis(2,6-dimethoxybenzoyl)-(2,4,4-trimethylpentyl)-phosphine oxide, 1-phenyl-1,2-propanedione-2-(o-ethoxycarbonyl) oxime, 1,2-octanedione, 1-[4-(phenylthio)-2-(O-benzoyloxime)], 1-phenyl-1,2-butanedione-2-(o-methoxycarbonyl) oxime, 1,3-diphenylpropanetrione-2-(o-ethoxycarbonyl) oxime, 1-(O-acetyl oxime)-1-[9-ethyl-6-(2-methylbenzoyl)-9H-carbazole-3-yl]ethanone, 4,4-bis(dimethylamino) benzophenone, 4,4-bis(diethylamino)benzophenone, ethyl p-dimethylaminobenzoate, 2-ethylhexyl-p-dimethylaminobenzoate, ethyl p-diethylaminobenzoate, diethoxyacetophenone, 2-hydroxy-2-methyl-1-phenylpropane-1-one, benzyl dimethyl ketal, 1-(4-isopropylphenyl)-2-hydroxy-2-methylpropane-1-one, 4-(2-hydroxyethoxy)phenyl-(2-hydroxy-2-propyl)ketone, 1-hydroxycyclohexyl-phenyl ketone, benzoin, benzoin methyl ether, benzoin ethyl ether, benzoin isopropyl ether, benzoin isobutyl ether, benzophenone, methyl o-benzoylbenzoate, 4-phenylbenzophenone, 4,4-dichlorobenzophenone, hydroxybenzophenone, 4-benzoyl-4'-methyldiphenyl sulfide, alkylated benzophenone, 3,3',4,4'-tetra(t-butylperoxycarbonyl)benzophenone, 4-benzoyl-N,N-dimethyl-N-[2-(1-oxy-2-propenyloxy)ethyl]benzenemethanaminium bromide, (4-benzoylbenzyl)trimethylammonium chloride, 2-hydroxy-3-(4-benzoylphenoxy)-N,N,N-trimethyl-1-propenaminium chloride monohydrate, 2-isopropylthioxanthone, 2,4-dimethylthioxanthone, 2,4-diethylthioxanthone, 2,4-dichlorothioxanthone, 2-hydroxy-3-(3,4-dimethyl-9-oxo-9H-thioxanthen-2-yloxy)-N,N,N-trimethyl-1-propanaminium chloride, 2,2'-bis(o-chlorophenyl)-4,5,4',5'-tetraphenyl-1,2-biimidazole, 10-butyl-2-chloroacridone, 2-ethylanthraquinone, benzyl, 9,10-phenanthlene quinone, camphor quinone, methyl phenyl glyoxylate, η5-cyclopentadienyl-η6-cumenyl-iron(1+)-hexafluorophosphate (1−), diphenylsulfide derivatives, bis (η5-2,4-cyclopentadien-1-yl)-bis(2,6-difluoro-3-(1H-pyrrol-1-yl)-phenyl)titanium, thioxanthone, 2-methylthioxanthone, 2-chlorothioxanthone, 4-benzoyl-4-methylphenyl ketone, dibenzyl ketone, fluorenone, 2,3-diethoxyacetophenone, 2,2-dimethoxy-2-phenyl-2-phenylacetophenone, 2-hydroxy-2-methylpropiophenone, p-t-butyldichloroacetophenone, benzyl methoxyethyl acetal, anthraquinone, 2-t-butylanthraquinone, 2-aminoanthraquinone, β-chloroanthraquinone, anthrone, benzanthrone, dibenzosuberone, methyleneanthrone, 4-azidobenzalacetophenone, 2,6-bis(p-azidobenzylidene)cyclohexane, 2,6-bis(p-azidobenzylidene)-4-methylcyclohexanone, naphthalenesulfonyl chloride, quinolinesulfonyl chloride, N-phenylthioacridone, benzthiazole disulfide, triphenylphosphine, carbon tetrabromide, tribromophenylsulfone, benzoyl peroxide, and combinations of a photoreducing dye (e.g., Eosine or Methylene Blue) and a reducing agent (e.g., ascorbic acid or triethanolamine). The siloxane resin composition may include two or more thereof.

Among these, an α-aminoalkylphenone compound, an acylphosphine oxide compound, an oxime ester compound, a benzophenone compound having an amino group, and a benzoate compound having an amino group are preferable for more enhancing the hardness of a cured film. These compounds concern not only a crosslinking reaction of a radical polymerizable group, but also a crosslinking reaction of siloxane as a base or acid during light irradiation and thermal curing, and thereby the hardness of a cured film is more improved.

Specific examples of the α-aminoalkylphenone compound include 2-methyl-[4-(methylthio)phenyl]-2-morpholinopropane-1-one, 2-dimethylamino-2-(4-methylbenzyl)-1-(4-morpholine-4-yl-phenyl)-butan-1-one, and 2-benzyl-2-dimethylamino-1-(4-morpholinophenyl)-butanone-1. Specific examples of the acylphosphine oxide compound include 2,4,6-trimethylbenzoylphenylphosphine oxide, bis(2,4,6-trimethylbenzoyl)-phenylphosphine oxide, and bis(2,6-dimethoxybenzoyl)-(2,4,4-trimethylpentyl)-phosphine oxide. Specific examples of the oxime ester compound include 1-phenyl-1,2-propanedione-2-(o-ethoxycarbonyl) oxime, 1,2-octanedione, 1-[4-(phenylthio)-2-(O-benzoyloxime)], 1-phenyl-1,2-butanedione-2-(o-methoxycarbonyl) oxime, 1,3-diphenylpropanetrione-2-(o-ethoxycarbonyl) oxime, and 1-(O-acetyl oxime)-1-[9-ethyl-6-(2-methylbenzoyl)-9H-carbazole-3-yl]ethanone. Specific examples of the benzophenone compound having an amino group include 4,4-bis(dimethylamino)benzophenone, and 4,4-bis(diethylamino)benzophenone. Specific examples of the benzoate compound having an amino group include ethyl p-dimethylaminobenzoate, 2-ethylhexyl-p-dimethylaminobenzoate, and ethyl p-diethylaminobenzoate.

The content of (B) the photo-radical polymerization initiator is preferably 0.01% by weight or more, and more preferably 0.1% by weight or more of the solid content of the siloxane resin composition. Further, the content is preferably 20% by weight or less, and more preferably 10% by weight or less. When the content is in the above range, radical curing can be sufficiently progressed and the elution of a remaining radical polymerization initiator can be prevented to ensure solvent resistance.

The siloxane resin composition includes (C) a compound having a radical polymerizable group and not having a Si—O—Si bond. By light irradiation, a radical is generated from (B) the photo-radical polymerization initiator, and the radical promotes the polymerization of (C) the compound having a radical polymerizable group and not having a Si—O—Si bond, and therefore an exposed portion of the siloxane resin composition becomes insoluble in an alkaline aqueous solution and thereby a negative type pattern can be formed. Examples of (C) the radical polymerizable group include a double bond and a triple bond. The siloxane resin composition may include two or more thereof.

The content of (C) the compound having a radical polymerizable group and not having a Si—O—Si bond is preferably 5 to 85% by weight, and more preferably 20 to 70% by weight of the solid content of the siloxane resin composition.

Examples of a functional group having a double bond include an acrylic group, a methacrylic group, a vinyl group, a styryl group, and an allyl group. Specific examples of a compound having a double bond include diethylene glycol diacrylate, triethylene glycol diacrylate, tetraethylene glycol diacrylate, diethylene glycol dimethacrylate, triethylene glycol dimethacrylate, tetraethylene glycol dimethacrylate, trimethylolpropane diacrylate, trimethylolpropane triacrylate, trimethylolpropane dimethacrylate, trimethylolpropane trimethacrylate, styrene, α-methylstyrene, 1,2-dihydronaphthalene, 1,3-diisopropenylbenzene, 3-methylstyrene, 4-methylstyrene, 2-vinylnaphthalene, butyl acrylate, butyl methacrylate, isobutyl acrylate, hexyl acrylate, isooctyl acrylate, 1,3-butanediol diacrylate, 1,3-butanediol dimethacrylate, neopentyl glycol diacrylate, 1,4-butanediol diacrylate, 1,4-butanediol dimethacrylate, 1,6-hexanediol diacrylate, 1,6-hexanediol methacrylate, 1,9-nonanediol dimethacrylate, 1,10-decanediol dimethacrylate, dimethylol-tricyclodecane diacrylate, pentaerythritol triacrylate, pentaerythritol tetraacrylate, pentaerythritol trimethacrylate, pentaerythritol tetramethacrylate, dipentaerythritol pentaacrylate, dipentaerythritol hexaacrylate, 2-hydroxyethyl acrylate, 2-hydroxyethyl methacrylate methylenebisacrylamide, N,N-dimethylacrylamide, 2,2,6,6-tetramethylpiperidinyl methacrylate, 2,2,6,6-tetramethylpiperidinyl acrylate, N-methyl-2,2,6,6-tetramethylpiperidinyl methacrylate, N-methyl-2,2,6,6-tetramethylpiperidinyl acrylate, N-vinylpyrrolidone, N-vinylcaprolactam, N-vinylcarbazole, cyclohexyl vinyl ether, cyclohexane dimethanol divinyl ether, cyclohexyl acrylate, cyclohexyl methacrylate, dicyclopentenyl acrylate, dicyclopentenyl methacrylate, dicyclopentenyl oxyethyl acrylate, dicyclopentenyl oxyethyl methacrylate, tricyclodecanyl acrylate, tricyclodecanyl methacrylate, dimethylol-tricyclodecane diacrylate, dimethylol-tricyclodecane dimethacrylate, isobornyl acrylate, isobornyl methacrylate, and ethoxylated bisphenol A diacrylate. Among these, polyfunctional compounds such as pentaerythritol triacrylate, pentaerythritol tetraacrylate, pentaerythritol trimethacrylate, pentaerythritol tetramethacrylate, dipentaerythritol pentaacrylate, and dipentaerythritol hexaacrylate are preferable from the viewpoint of an improvement in sensitivity. Further, from the viewpoint of hydrophobicity, tricyclodecanyl acrylate, tricyclodecanyl methacrylate, dimethylol-tricyclodecane diacrylate, dimethylol-tricyclodecane dimethacrylate, isobornyl acrylate, and isobornyl methacrylate are preferable.

Examples of a functional group having a triple bond include an ethynyl group and a propargyl group. Specific examples of the compound having a triple bond include 1-butyne, 2-butyne, ethynylbenzene, 1,4-diethynylbenzene, 1,3-diethynylbenzene, 1,2-diethynylbenzene, 1-ethynylnaphthalene, 2-ethynylnaphthalene, 4-ethynylphthalic anhydride, propargyl acetate, methyl propargylate, ethyl propargylate, and propargyl propynoate. These compounds having a triple bond are preferably used in combination with the compound having a double bond from the viewpoint of polymerization.

The content of the compound containing a double bond and/or a triple bond is preferably 1 part by weight or more, and more preferably 25 parts by weight or more with respect to 100 parts by weight of (A) the polysiloxane having a carboxyl group and a radical polymerizable group. When the content is 1 part by weight or more, curing of the resin composition by light irradiation can be progressed efficiently. On the other hand, the content is preferably 250 parts by weight or less, and more preferably 150 parts by weight or less. When the content is 250 parts by weight or less, the transmittance of a cured film can be improved.

At least one (C) the compound having a radical polymerizable group and not having a Si—O—Si bond is preferably a compound represented by the general formula (1). By virtue of the compound represented by the general formula (1), heat resistance and adhesion are improved.

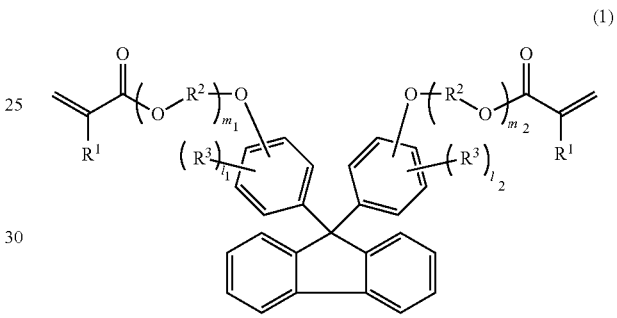

(1)

In the above formula, $R^1$ represents hydrogen or a methyl group. $R^2$ represents a linear or a branched alkylene group. $R^3$ represents an organic group having 1 to 20 carbon atoms. $l_1$ and $l_2$ represent an integer of 0 to 4. $l_1$ and $l_2$ may be the same or different. $m_1$ and $m_2$ represent an integer of 1 to 20. $m_1$ and $m_2$ may be the same or different.

In the above formula, specific examples of $R^2$ include an ethylene group, a propylene group, and a butylene group. Specific examples of $R^3$ include alkyl groups such as a methyl group, an ethyl group, a propyl group, an isopropyl group, a butyl group, a s-butyl group and a t-butyl group; and aryl groups such as a phenyl group, a tolyl group, a mesityl group, a styryl group, and a naphthyl group.

Specific examples of the compound represented by the general formula (1) include 9,9-bis[4-(2-acryloyloxyethoxy)phenyl]fluorene, 9,9-bis[4-(2-methacryloyloxyethoxy)phenyl]fluorene, 9,9-bis[4-(2-acryloyloxypropoxy)phenyl]fluorene, 9,9-bis[4-(2-methacryloyloxypropoxy)phenyl]fluorene, 9,9-bis[4-(3-acryloyloxybutoxy)phenyl]fluorene, 9,9-bis[4-(3-methacryloyloxybutoxy)phenyl]fluorene, 9,9-bis[4-(2-acryloyloxyethoxy)-3-methylphenyl]fluorene, 9,9-bis[4-(2-methacryloyloxyethoxy)-3-methylphenyl]fluorene, (2-acryloyloxypropoxy)-3-methylphenyl]fluorene, 9,9-bis[4-(2-methacryloyloxypropoxy)-3-methylphenyl]fluorene, 9,9-bis[4-(3-acryloyloxybutoxy)-3-methylphenyl]fluorene, 9,9-bis[4-(3-methacryloyloxybutoxy)-3-methylphenyl]fluorene, 9,9-bis[4-(2-acryloyloxyethoxy)-3,5-dimethylphenyl]fluorene, 9,9-bis[4-(2-acryloyloxyethoxy)-3,5-dimethylphenyl]fluorene, (2-acryloyloxypropoxy)-3,5-dimethylphenyl]fluorene, 9,9-bis[4-(2-methacryloyloxypropoxy)-3,5-dimethylphenyl]fluorene, 9,9-bis[4-(3-acryloyloxybutoxy)-3,5-dimethylphenyl]fluorene, 9,9-bis[4-(3-methacryloyloxybutoxy)-3,5-dimethylphenyl]fluorene, 9,9- bis[4-(2-acryloyloxyethoxy)-3-phenylphenyl]fluorene, 9,9-bis[4-(2-methacryloyloxyethoxy)-3-phenylphenyl]fluorene, 9,9-bis[4-(2-acryloyloxypropoxy)-3-phenylphenyl]fluorene, 9,9-bis[4-(2-methacryloyloxypropoxy)-3-phenylphenyl] fluorene, 9,9-bis[4-(3-acryloyloxybutoxy)-3-phenylphenyl] fluorene, and 9,9-bis[4-(3-methacryloyloxybutoxy)-3-phenylphenyl]fluorene. Among these, 9,9-bis[4-(2-acryloyloxyethoxy)phenyl]fluorene, 9,9-bis[4-(2-acryloyloxypropoxy)phenyl]fluorene, and 9,9-bis[4-(3-acryloyloxybutoxy)phenyl]fluorene are preferable from the viewpoint of sensitivity and adhesion. Two or more thereof may be used. Further, from the viewpoint of hardness and sensitivity, it is preferable to combine with a compound having a polyfunctional radical polymerizable group, and specific examples thereof include pentaerythritol triacrylate, pentaerythritol tetraacrylate, pentaerythritol trimethacrylate, pentaerythritol tetramethacrylate, dipentaerythritol pentaacrylate, dipentaerythritol hexaacrylate, and poly(meth) acrylate described later.

(C) the compound having a radical polymerizable group and not having a Si—O—Si bond is preferably a compound having at least one radical polymerizable group selected from the group consisting of tripentaerythritol poly(meth)acrylate, tetrapentaerythritol poly(meth)acrylate and pentapentaerythritol poly(meth)acrylate. Herein, (meth)acrylate refers to a generic name for acrylate and methacrylate. Further, "poly (meth)acrylate" refers to a compound having seven or more acrylate groups or methacrylate groups in total, and the number of acrylate groups or methacrylate groups is preferably fourteen or less. By using the compound having a radical polymerizable group consisting of the group, the hardness and the abrasion resistance of the resulting cured film are improved.

Specific examples of the compound having a radical polymerizable group consisting of the above group include tripentaerythritol heptaacrylate, tripentaerythritol octaacrylate, tetrapentaerythritol nonaacrylate, tetrapentaerythritol decaacrylate, pentapentaerythritol undecaacrylate, pentapentaerythritol dodecaacrylate, tripentaerythritol heptamethacrylate, tripentaerythritol octamethacrylate, tetrapentaerythritol nonamethacrylate, tetrapentaerythritol decamethacrylate, pentapentaerythritol undecamethacrylate, and pentapentaerythritol dodecamethacrylate. Two or more thereof may be used.

(C) the compound having a radical polymerizable group and not having a Si—O—Si bond may include a carboxyl group and/or a hydroxyl group. By including a carboxyl group and/or a hydroxyl group, adhesion to a substrate is improved and pattern peeling during development can be inhibited.

Specific examples of the compound, which includes a double bond, and a carboxyl group and/or a hydroxyl group, include acrylic acid, methacrylic acid, 2-acryloyloxyethyl succinic acid, 2-acryloyloxyethyl hexahydrophthalic acid, 2-acryloyloxyethyl phthalic acid, 1,3-acryloyloxy-2-hydroxypropane, 1,3-methacryloyloxy-2-hydroxypropane, N-methylolacrylamide, 2-hydroxy-3-phenoxypropylacrylate, a methacrylic acid adduct of ethylene glycol diglycidyl ether (trade name Epoxy Ester 40EM manufactured by kyoeisha Chemical Co., Ltd.), an acrylic acid adduct of ethylene glycol diglycidyl ether, a methacrylic acid adduct of propylene glycol diglycidyl ether, an acrylic acid adduct of propylene glycol diglycidyl ether (trade name Epoxy Ester 70PA manufactured by kyoeisha Chemical Co., Ltd.), a methacrylic acid adduct of tripropylene glycol diglycidyl ether, an acrylic acid adduct of tripropylene glycol diglycidyl ether (trade name Epoxy Ester 200PA manufactured by kyoeisha Chemical Co., Ltd.), a methacrylic acid adduct of glycerin diglycidyl ether, an acrylic acid adduct of glycerin diglycidyl ether (trade name Epoxy Ester 80MFA manufactured by kyoeisha Chemical Co., Ltd.), a methacrylic acid adduct of bisphenol A diglycidyl ether (trade name Epoxy Ester 3000M manufactured by kyoeisha Chemical Co., Ltd.), an acrylic acid adduct of bisphenol A diglycidyl ether (trade name Epoxy Ester 3000A manufactured by kyoeisha Chemical Co., Ltd.), a methacrylic acid adduct of bisphenol A propyleneoxide adduct diglycidyl ether (trade name Epoxy Ester 3002M manufactured by kyoeisha Chemical Co., Ltd.), and an acrylic acid adduct of bisphenol A propyleneoxide adduct diglycidyl ether (trade name Epoxy Ester 3002A manufactured by kyoeisha Chemical Co., Ltd.). Specific examples of the compound, which includes a triple bond, and a carboxyl group and/or a hydroxyl group, include propargyl alcohol, propynoic acid, 4-ethynylphthalic acid, 3-(3-aminophenyl) propynoic acid, and 3-phenylpropynoic acid.

The content of the compound, which includes a double bond and/or a triple bond, and a carboxyl group and/or a hydroxyl group, is preferably 1 part by weight or more, and more preferably 3 parts by weight or more with respect to 100 parts by weight of (A) the polysiloxane having a carboxyl group and a radical polymerizable group. When the content is 1 part by weight or more, adhesion to the substrate is more improved. On the other hand, the content is preferably 50 parts by weight or less, and more preferably 30 parts by weight or less. When the content is 50 parts by weight or less, permeance resistance is improved.

Further, the siloxane resin composition may contain an organosilane compound having a radical polymerizable group to such an extent that does not impair the effects of the present invention. By including the organosilane compound having a radical polymerizable group other than a (meth) acrylic group, the number of crosslinking points increases and therefore the hardness of a cured film is more improved. Further, when the organosilane compound has an organic group having three or more carbon atoms between the radical polymerizable group and the silane atom, cracking resistance is more improved since the organic group acts as a spacer between a (meth)acrylic site and a siloxane site.

The content of the organosilane compound having a radical polymerizable group is not particularly limited, but it is preferably 0.1% by weight or more of the solid content of the siloxane resin composition, and when the content is in the range, the hardness of a cured film can be more improved. The content is more preferably 1% by weight or more. On the other hand, the content is preferably 30% by weight or less, and more preferably 15% by weight or less from the viewpoint of cracking resistance of a cured film.

Specific examples of the organosilane compound having a radical polymerizable group include vinyltrimethoxysilane, vinyltriethoxysilane, vinyltriacetoxysilane, styryltrimethoxysilane, styryltriethoxysilane, and styryltriacetoxysilane. Two or more thereof may be used. Among these, vinyltrimethoxysilane and vinyltriethoxysilane are particularly preferably used from the viewpoint of the hardness of a cured film.

The siloxane resin composition may further include (D) metal compound particles. By containing (D) the metal compound particles, a refractive index can be adjusted to the desired range. Further, the hardness, the abrasion resistance and the cracking resistance of a cured film can be more improved. The number average particle size of (D) the metal compound particles is preferably 1 to 200 nm. The number average particle size is more preferably 1 to 70 nm for attaining a cured film with high transmittance. Herein, the number average particle size of the metal compound particles can be measured by a gas adsorption method, a dynamic light scattering method, an X-ray small angle scattering method, a transmission electron microscope or a scanning electron microscope.

Examples of (D) the metal compound particles include silicon compound particles, aluminum compound particles, tin compound particles, titanium compound particles, zirconium compound particles and barium compound particles, and appropriate metal compound particles can be selected in accordance with use. For example, in order to obtain a cured film with high refractive index, titanium compound particles such as titanium oxide particles or zirconium compound particles such as zirconium oxide particles are preferably used. In order to obtain a cured film with a low refractive index, the siloxane resin composition preferably includes hollow silica particles.

Examples of commercially available metal compound particles include "Optolake (registered trademark)" TR-502, "Optolake" TR-503, "Optolake" TR-504, "Optolake" TR-513, "Optolake" TR-520, "Optolake" TR-527, "Optolake" TR-528, and "Optolake" TR-529, which are silicon oxide-titanium oxide composite particles, and "Optolake" TR-505, which is a titanium oxide particle (every trade name, manufactured by Catalysts & Chemicals Ind. Co., Ltd.), a zirconium oxide particle (manufactured by Kojundo Chemical Laboratory Co., Ltd.), a tin oxide-zirconium oxide composite particle (manufactured by Catalysts & Chemicals Ind. Co., Ltd.), and a tin oxide particle (manufactured by Kojundo Chemical Laboratory Co., Ltd.).

Further, examples of the silica particle include IPA-ST and MIBK-ST, having a number average particle size of 12 nm, IPA-ST-L having a number average particle size of 45 nm, IPA-ST-ZL having a number average particle size of 100 nm, PGM-ST having a number average particle size of 15 nm (these are trade names, manufactured by Nissan Chemical Industries, Ltd.), "OSCAL (registered trademark)" 101 having a number average particle size of 12 nm, "OSCAL" 105 having a number average particle size of 60 nm, "OSCAL" 106 having a number average particle size of 120 nm, "CATALOID (registered trademark)"-S having a number average particle size of 5 to 80 nm (these are trade names, manufactured by Catalysts & Chemicals Ind. Co., Ltd.), "Quartron (registered trademark)" PL-2L-PGME having a number average particle size of 16 nm, "Quartron" PL-2L-BL and "Quartron" PL-2L-DAA, having a number average particle size of 17 nm, "Quartron" PL-2L and GP-2L, having a number average particle size of 18 to 20 nm (these are trade names, manufactured by FUSO CHEMICAL Co., Ltd.), Silica ($SiO_2$) SG-SO 100 having a number average particle size of 100 nm (trade name, manufactured by KCM Corp.), and "REOLOSIL (registered trademark)" having a number average particle size of 5 to 50 nm (trade name, manufactured by Tokuyama Corp.). Further, examples of the hollow silica particle include "Optolake" TR-113.

The content of the metal compound particle is not particularly limited and any appropriate amount may be selected according to its use, but the content is generally about 1 to 70% by weight of the solid content in the siloxane resin composition.

The siloxane resin composition may further include (E) polysiloxane not including a carboxyl group. By including (E) the polysiloxane not including a carboxyl group, adhesion at the time of high-temperature heat treatment (at a temperature of 230 to 250° C. for 3 hours) of ITO of a cured film can be improved. Specific examples of (E) the polysiloxane not including a carboxyl group preferably include polysiloxane obtained by hydrolyzing 20 to 70 mol % of phenyltrialkoxysilane from the viewpoint of alkali-solubility, 15 to 50 mol % of methyltrialkoxysilane from the viewpoint of hardness, and 5 to 40 mol % of 2-(3,4-epoxycyclohexyl)ethyltrimethoxysilane, and condensing a hydrolysate.

The content of (E) the polysiloxane not including a carboxyl group is preferably 5% by weight or more, and more preferably 10% by weight or more of the solid content of the siloxane resin composition. On the other hand, the content is preferably 35% by weight or less, and more preferably 30% by weight or less for maintaining the high hardness of a cured film and from the viewpoint of photosensitivity (alkali-solubility).

The siloxane resin composition may contain a polymerization inhibitor. By including the polymerization inhibitor, the storage stability of the resin composition is improved and the resolution after development is improved. The content of the polymerization inhibitor is 0.01% by weight or more, and preferably 0.1% by weight or more and 1% by weight or less of the solid content of the siloxane resin composition.

Specific examples of the polymerization inhibitor include phenol, cathecol, resorcinol, hydroquinone, 4-t-butylcatechol, 2,6-di(t-butyl)-p-cresol, phenothiazine, and 4-methoxyphenol.

The siloxane resin composition may contain an ultraviolet absorber. By containing the ultraviolet absorber, the lightfastness of the resulting cured film is improved, and the resolution after development is improved in applications which require pattern processing. The ultraviolet absorber is not particularly limited and a known absorber can be used, but a benzotriazole-based compound, a benzophenone-based compound, and a triazine-based compound are preferably used from the viewpoint of transparency and non-coloring properties.

Examples of the ultraviolet absorber of a benzotriazole-based compound include 2-(2H-benzotriazole-2-yl)phenol, 2-(2H-benzotriazole-2-yl)-4,6-tert-pentylphenol, 2-(2H-benzotriazole-2-yl)-4-(1,1,3,3-tetramethylbutyl)phenol, 2-(2H-benzotriazole-2-yl)-6-dodecyl-4-methylphenol, and 2-(2'-hydroxy-5'-methacryloxyethylphenyl)-2H-benzotriazole. Examples of the ultraviolet absorber of a benzophenone-based compound include 2-hydroxy-4-methoxybenzophenone. Examples of the ultraviolet absorber of a triazine-based compound include 2-(4,6-diphenyl-1,3,5-triazine-2-yl)-5-[(hexyl)oxy]-phenol.

The siloxane resin composition may contain a solvent. The compound having an alcoholic hydroxyl group or the cyclic compound having a carbonyl group are preferably used in that the respective components are uniformly dissolved in these compounds and the transparency of the resulting applied film can be improved. Two or more thereof may be used. Further, a compound having a boiling point of 110 to 250° C. under an atmospheric pressure are more preferable. When the boiling point is 110° C. or higher, drying of an applied film is moderately advanced during applying the film and a good applied film free-from uneven application is obtained. On the other hand, when the boiling point is 250° C. or lower, an amount of a solvent remaining in the film can be kept low and film shrinkage during thermally curing can be more reduced, and therefore a better planarization property is achieved.

Specific examples of the compound, which has an alcoholic hydroxyl group and a boiling point of 110 to 250° C. under an atmospheric pressure, include acetol, 3-hydroxy-3-methyl-2-butanone, 4-hydroxy-3-methyl-2-butanone, 5-hydroxy-2-pentanone, 4-hydroxy-4-methyl-2-pentanone (diacetone alcohol), ethyl lactate, butyl lactate, propylene glycol monomethyl ether, propylene glycol monoethyl ether, propylene glycol mono-n-propyl ether, propylene glycol mono-n- butyl ether, propylene glycol mono-t-butyl ether, 3-methoxy-1-butanol, and 3-methyl-3-methoxy-1-butanol. Among these compounds, diacetone alcohol is preferable from the viewpoint of storage stability, and propylene glycol mono-t-butyl ether is particularly preferably used from the viewpoint of a step-covering property.

Specific examples of the cyclic compound, which has a carbonyl group and a boiling point of 110 to 250° C. under an atmospheric pressure, include γ-butyrolactone, γ-valerolactone, δ-valerolactone, propylene carbonate, N-methylpyrrolidone, cyclohexanone, and cycloheptanone. Among these compounds, γ-butyrolactone is particularly preferably used.

Further, the siloxane resin composition may contain a solvent other than the above solvents. Examples of the solvent other than the above solvents include various solvents such as acetates, ketones, and ethers which have been exemplified as the solvent to be used for the hydrolysis and condensation reaction of (A) the polysiloxane having a carboxyl group and a radical polymerizable group.

The content of the solvent is not particularly limited and any amount of the solvent can be used in accordance with an application method. For example, when a film is formed by spin coating, the amount of the solvent is generally 50 to 95% by weight of the whole siloxane resin composition.

The siloxane resin composition may contain various curing agents which promote or facilitate the curing of the resin composition. The curing agent is not particularly limited and a known curing agent can be used, and specific examples thereof include a nitrogen-containing organic substance, a silicone resin curing agent, various metal alcolates, various metal chelate compounds, an isocyanate compound, and polymers, methylolated melamine derivatives and methylolated urea derivatives thereof. Two or more thereof may be used. Among these, metal chelate compounds, methylolated melamine derivatives, and methylolated urea derivatives are preferably employed from the viewpoint of stability of a curing agent and processability of the resulting applied film.

Since curing of the polysiloxane is accelerated by acid, the siloxane resin composition may contain a curing catalyst such as a thermal acid generator. The thermal acid generator is not particularly limited, and a known thermal acid generator can be used, and examples thereof include various onium salt-based compounds such as an aromatic diazonium salt, a sulfonium salt, a diaryliodoniunm salt, a triarylsulfonium salt and a triarylselenium salt; sulfonic acid ester; and a halogen compound.

The siloxane resin composition may contain various surfactants such as various fluorine-based surfactants and silicone-based surfactants for improving a flowing property at the time of applying the siloxane resin composition. Type of the surfactant is not particularly limited, and it is possible to employ, for example, fluorine-based surfactants such as "Megafac (registered trademark)" F142D, "Megafac" F172, "Megafac" F173, "Megafac" F183, "Megafac" F445, "Megafac" F470, "Megafac" F475 and "Megafac" F477 (every produced by Dainippon Ink and Chemicals, Inc.), NBX-15 and FTX-218 (every produced by NEOS Co., Ltd.), and silicone-based surfactants such as BYK-333, BYK-301, BYK-331, BYK-345 and BYK-307 (manufactured by BYK Japan KK), polyalkyleneoxide-based surfactants, and poly(meth)acrylate-based surfactants. Two or more thereof may be used.

The siloxane resin composition may also contain additives such as a dissolution inhibitor, a stabilizer and an antifoaming agent as required.

The solid concentration of the siloxane resin composition is not particularly limited, and any amount of a solvent or a solute can be used depending on an application method. For example, when the film is formed by spin coating as described later, the solid concentration of 5 to 50% by weight is generally employed.

A typical method for producing a siloxane resin composition will be described below.

For example, (B) a photo-radical polymerization initiator and other additives are added to an arbitrary solvent and the resulting mixture is stirred and dissolved, and then to this, (A) a polysiloxane solution and (C) a compound having a radical polymerizable group and not having a Si—O—Si bond, synthesized by the above-mentioned method, are added, and the resulting mixture is stirred for 20 minutes to 3 hours. The resulting solution is filtered to obtain a siloxane resin composition.

In the obtained siloxane resin composition, the structure of each component can be identified by known analyzing methods (NMR, IR, MS, etc.) after separating/fractionating each component by high-performance liquid chromatography (HPLC).

A method for forming a cured film by use of the siloxane resin composition will be described with examples.

The siloxane resin composition is applied onto a base substrate by a known method such as microgravure coating, spin coating, dip coating, curtain flow coating, roll coating, spray coating or slit coating, and pre-baked by a heating apparatus such as a hot plate or an oven. The pre-bake is preferably carried out at a temperature of 50 to 150° C. for 30 seconds to 30 minutes to form a film with a thickness of 0.1 to 15 μm after the pre-bake.

After pre-baking, the film is irradiated with light of about 10 to about 4000 J/m$^2$ (on the exposure amount at wavelength 365 nm equivalent basis) through a desired mask or without using a mask by use of an exposure machine such as a stepper, a mirror projection mask aligner (MPA) or a parallel light mask aligner (PLA). An exposure light source is not particularly limited, and ultraviolet light such as i-line, g-line and h-line, KrF (wavelength 248 nm) laser, or ArF (wavelength 193 nm) laser can be used. Thereafter, post-exposure baking, in which the film is heated at a temperature of 150 to 450° C. for about 1 hour by a heating apparatus such as a hot plate or an oven, may be performed.

The siloxane resin composition preferably has the sensitivity of 100 to 4000 J/m$^2$ at exposure by the PLA. The aforementioned sensitivity at patterning exposure by the PLA is determined, for example, by the following method. The composition is applied onto a silicon wafer by spin-coating at an arbitrary rotating speed using a spin coater, and the applied composition is pre-baked at 120° C. for 2 minutes by use of a hot plate to prepare a film having a film thickness of 2 μm. The prepared film is exposed to an ultra high pressure mercury lamp through a gray scale mask for sensitivity measurement using the PLA (PLA-501F manufactured by Canon Inc.). The exposed film is then developed by paddling of a 2.38% by weight aqueous solution of tetramethylammonium hydroxide for an arbitrary time period using an automatic developing apparatus (AD-2000 manufactured by Takizawa Sangyo Co., Ltd.), and then rinsed with water for 30 seconds. In the formed pattern, the exposure amount at which 30 μm line-and-space patterns are resolved at a width ratio of 1:1 is identified as the sensitivity.

After patterning exposure, exposed areas can be dissolved by development to obtain a negative type pattern. A developing method is preferably a method in which the negative type pattern is immersed in a developer for 5 seconds to 10 minutes using a technique such as showering, dipping or paddling. As the developer, a known alkaline developer can be employed. Specific examples of the alkaline developer include an aqueous solution containing one or two or more kinds of inorganic alkalis such as hydroxide, carbonate, phosphate, silicate and borate of alkali metals, amines such as 2-diethylaminoethanol, monoethanolamine and diethanolamine, and quaternary ammonium salts such as tetramethylammonium hydroxide and choline. After development, the film is preferably rinsed with water, and subsequently, it may be dry-baked in a temperature range of 50 to 150° C. Thereafter, this film is thermally cured in a temperature range of 120 to 280° C. for about 1 hour with a heating apparatus such as a hot plate or an oven to obtain a cured film.

The resolution of the cured film made from the siloxane resin composition is preferably 20 μm or less. A film thickness of the cured film is not particularly limited, but it is preferably 0.1 to 15 μm. Further, it is preferable that the cured film has the hardness of 4H or more and the transmittance of 90% or more at the film thickness of 1.5 μm. In addition, the transmittance refers to a transmittance at a wavelength of 400 nm. The hardness and the transmittance can be adjusted by selecting an exposure amount and a thermal curing temperature.

The cured film obtained by curing the siloxane resin composition is used as a protective film for a touch panel, various hard coating materials, an antireflection film, and an optical filter. Further, since the cured film has negative type photosensitivity, the cured film is suitably used for an insulation film for a touch sensor, and a planarization film for a TFT, an insulation film, an antireflection film, an overcoat for a color filter and a column material of a liquid crystal display and an organic EL display. Among these applications, the cured film can be suitably used for a protective film for a touch panel because it has high hardness and high abrasion resistance. Examples of a touch panel type include a resistance film type, an optical type, an electromagnetic induction type, and a capacitance type. The cured film can be suitably used for a capacitance type touch panel since the capacitance type touch panel requires particularly high hardness.

EXAMPLES

Hereinafter, the present invention will be described by way of examples thereof, but an aspect of the present invention is not limited to these examples.

Synthesis Example 1

Synthesis of Carboxyl Group-Containing Silane Compound (A)

Into a 300 ml eggplant flask, 23.23 g of p-aminobenzoic acid and 209.05 g of propylene glycol monomethyl ether acetate (PGMEA) were charged, and the resulting mixture was stirred at room temperature for 30 minutes to dissolve the p-aminobenzoic acid. Into the resulting solution, 46.53 g of isocyanatepropyltriethoxysilane and 1.19 g of dibutyltin dilaurate were charged, and the resulting mixture was stirred for 1 hour in an oil bath of 70° C. Thereafter, the resulting solution was left standing to be cooled to room temperature, and the resulting precipitated solid was separated by filtering with a glass filter and dried to obtain a carboxyl group-containing silane compound (A). The yield of the carboxyl group-containing silane compound (A) was 46.7 g.

Synthesis Example 2

Synthesis of Carboxyl Group-Containing Silane Compound (B)

Into a 300 ml eggplant flask, 23.39 g of p-hydroxybenzoic acid and 210.5 g of PGMEA were charged, and the resulting mixture was stirred at room temperature for 30 minutes to dissolve the p-hydroxybenzoic acid. Into the resulting solution, 46.53 g of isocyanatepropyltriethoxysilane and 1.19 g of dibutyltin dilaurate were charged, and the resulting mixture was stirred for 3 hours in an oil bath of 40° C. Thereafter, the resulting solution was left standing to be cooled to room temperature, and the resulting precipitated solid was separated by filtering with a glass filter and dried to obtain a carboxyl group-containing silane compound (B). The yield of the carboxyl group-containing silane compound (B) was 42.4 g.

Synthesis Example 3

Synthesis of Polysiloxane Solution (i)

Into a 500 ml three-necked flask, 17.03 g (0.125 mol) of methyltrimethoxysilane, 19.83 g (0.1 mol) of phenyltrimethoxysilane, 38.42 g (0.1 mol) of the carboxyl group-containing silane compound (A), 41.02 g (0.175 mol) of γ-acryloylpropyltrimethoxysilane, and 109.61 g of diacetone alcohol (DAA) were charged, and to the resulting mixture, an aqueous solution of phosphoric acid, which was obtained by dissolving 0.237 g (0.2% by weight with respect to the weight of charged monomers) of phosphoric acid in 27.0 g of water, was added over 10 minutes by use of a dropping funnel while stirring the mixture with the flask immersed in an oil bath of 40° C. After stirring the mixture at 40° C. for 1 hour, an oil bath temperature was set at 70° C. and the mixture was stirred for 1 hour, and further the oil bath temperature was raised to 115° C. over 30 minutes. A temperature of the resulting solution reached 100° C. after a lapse of one hour from the start of temperature rising, and the solution was heated and stirred for further 2 hours (the temperature of the solution was 100 to 110° C.). Methanol, ethanol and water (in total, 55 g) as by-products were distilled during the reaction. DAA was added to the resulting DAA solution of polysiloxane so as to achieve a polymer concentration of 40% by weight to obtain a polysiloxane solution (i). The weight average molecular weight (Mw) of the obtained polymer was measured by gel permeation chromatography (GPC), and consequently it was 8000 (on the polystyrene equivalent basis).

Synthesis Example 4

Synthesis of Polysiloxane Solution (ii)

Into a 500 ml three-necked flask, 17.03 g (0.125 mol) of methyltrimethoxysilane, 19.83 g (0.1 mol) of phenyltrimethoxysilane, 38.52 g (0.1 mol) of the carboxyl group-containing silane compound (B), 41.02 g (0.175 mol) of γ-acryloylpropyltrimethoxysilane, and 109.61 g of DAA were charged, and to the resulting mixture, an aqueous solution of phosphoric acid, which was obtained by dissolving 0.237 g (0.2% by weight with respect to the weight of charged monomers) of phosphoric acid in 27.0 g of water, was added over 10 minutes by use of a dropping funnel while stirring the mixture with the flask immersed in an oil bath of 40° C. Then, when the mixture was heated and stirred under the same conditions as in Synthesis Example 3, methanol, ethanol and water (in total, 55 g) as by-products were distilled during the reaction. DAA was added to the resulting DAA solution of polysiloxane so as to achieve a polymer concentration of 40% by weight to obtain a polysiloxane solution (ii). The weight average molecular weight of the obtained polymer was measured by GPC, and consequently it was 6000 (on the polystyrene equivalent basis).

Synthesis Example 5

Synthesis of Polysiloxane Solution (iii)

Into a 500 ml three-necked flask, 34.05 g (0.25 mol) of methyltrimethoxysilane, 39.66 g (0.20 mol) of phenyltrimethoxysilane, 41.66 g (0.20 mol) of 4-(trimethoxysilyl)butanoic acid, 82.03 g (0.35 mol) of γ-acryloylpropyltrimethoxysilane, and 185.08 g of DAA were charged, and to the resulting mixture, an aqueous solution of phosphoric acid, which was obtained by dissolving 0.395 g (0.2% by weight with respect to the weight of charged monomers) of phosphoric acid in 54.0 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 110 g) as by-products were distilled during the reaction. DAA was added to the resulting DAA solution of polysiloxane so as to achieve a polymer concentration of 40% by weight to obtain a polysiloxane solution (iii). The weight average molecular weight of the obtained polymer was measured by GPC, and consequently it was 5500 (on the polystyrene equivalent basis).

Synthesis Example 6

Synthesis of Polysiloxane Solution (iv)

Into a 500 ml three-necked flask, 47.67 g (0.35 mol) of methyltrimethoxysilane, 39.66 g (0.20 mol) of phenyltrimethoxysilane, 26.23 g (0.10 mol) of 3-trimethoxysilylpropylsuccinic acid, 82.03 g (0.35 mol) of γ-acryloylpropyltrimethoxysilane, and 185.08 g of DAA were charged, and to the resulting mixture, an aqueous solution of phosphoric acid, which was obtained by dissolving 0.401 g (0.2% by weight with respect to the weight of charged monomers) of phosphoric acid in 55.8 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 110 g) as by-products were distilled during the reaction. DAA was added to the resulting DAA solution of polysiloxane so as to achieve a polymer concentration of 40% by weight to obtain a polysiloxane solution (iii). The weight average molecular weight of the obtained polymer was measured by GPC, and consequently it was 5500 (on the polystyrene equivalent basis).

Synthesis Example 7

Synthesis of Polysiloxane Solution (v)

Into a 500 ml three-necked flask, 55.84 g (0.41 mol) of methyltrimethoxysilane, 39.66 g (0.20 mol) of phenyltrimethoxysilane, 10.49 g (0.04 mol) of 3-trimethoxysilylpropylsuccinic acid, 82.04 g (0.35 mol) of γ-acryloylpropyltrimethoxysilane, and 173.57 g of DAA were charged, and to the resulting mixture, an aqueous solution of phosphoric acid, which was obtained by dissolving 0.376 g (0.2% by weight with respect to the weight of charged monomers) of phosphoric acid in 54.72 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 90 g) as by-products were distilled during the reaction. DAA was added to the resulting DAA solution of polysiloxane so as to achieve a polymer concentration of 40% by weight to obtain a polysiloxane solution (v). The weight average molecular weight of the obtained polymer was measured by GPC, and consequently it was 70000 (on the polystyrene equivalent basis).

Synthesis Example 8

Synthesis of Polysiloxane Solution (vi)

Into a 500 ml three-necked flask, 39.66 g (0.20 mol) of phenyltrimethoxysilane, 118.05 g (0.45 mol) of 3-trimethoxysilylpropylsuccinic acid, 82.04 g (0.35 mol) of γ-acryloylpropyltrimethoxysilane, and 221.31 g of DAA were charged, and to the resulting mixture, an aqueous solution of phosphoric acid, which was obtained by dissolving 0.479 g (0.2% by weight with respect to the weight of charged monomers) of phosphoric acid in 62.10 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 90 g) as by-products were distilled during the reaction. DAA was added to the resulting DAA solution of polysiloxane so as to achieve a polymer concentration of 40% by weight to obtain a polysiloxane solution (vi). The weight average molecular weight of the obtained polymer was measured by GPC, and consequently it was 70000 (on the polystyrene equivalent basis).

Synthesis Example 9

Synthesis of Polysiloxane Solution (vii)

Into a 500 ml three-necked flask, 88.53 g (0.65 mol) of methyltrimethoxysilane, 39.66 g (0.20 mol) of phenyltrimethoxysilane, 26.23 g (0.10 mol) of 3-trimethoxysilylpropylsuccinic acid, 11.72 g (0.05 mol) of γ-acryloylpropyltrimethoxysilane, and 153.36 g of DAA were charged, and to the resulting mixture, an aqueous solution of phosphoric acid, which was obtained by dissolving 0.332 g (0.2% by weight with respect to the weight of charged monomers) of phosphoric acid in 55.80 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 90 g) as by-products were distilled during the reaction. DAA was added to the resulting DAA solution of polysiloxane so as to achieve a polymer concentration of 40% by weight to obtain a polysiloxane solution (vii). The weight average molecular weight of the obtained polymer was measured by GPC, and consequently it was 50000 (on the polystyrene equivalent basis).

Synthesis Example 10

Synthesis of Polysiloxane Solution (viii)

26.23 g (0.10 mol) of 3-trimethoxysilylpropylsuccinic acid, 210.96 g (0.90 mol) of γ-acryloylpropyltrimethoxysilane, and 218.95 g of DAA were charged, and to the resulting mixture, an aqueous solution of phosphoric acid, which was obtained by dissolving 0.474 g (0.2% by weight with respect to the weight of charged monomers) of phosphoric acid in 55.80 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 90 g) as by-products were distilled during the reaction. DAA was added to the resulting DAA solution of polysiloxane so as to achieve a polymer concentration of 40% by weight to obtain a polysiloxane solution (viii). The weight average molecular weight of the obtained polymer was measured by GPC, and consequently it was 80000 (on the polystyrene equivalent basis).

Synthesis Example 11

Synthesis of Polysiloxane Solution (ix)

Into a 500 ml three-necked flask, 47.67 g (0.35 mol) of methyltrimethoxysilane, 39.66 g (0.20 mol) of phenyltrimethoxysilane, 26.23 g (0.10 mol) of 3-trimethoxysilylpropylsuccinic acid, 87.29 g (0.35 mol) of γ-methacryloylpropyltrimethoxysilane, and 185.40 g of DAA were charged, and to the resulting mixture, an aqueous solution of phosphoric acid, which was obtained by dissolving 0.401 g (0.2% by weight with respect to the weight of charged monomers) of phosphoric acid in 55.8 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 110 g) as by-products were distilled during the reaction. DAA was added to the resulting DAA solution of polysiloxane so as to achieve a polymer concentration of 40% by weight to obtain a polysiloxane solution (ix). The weight average molecular weight of the obtained polymer was measured by GPC, and consequently it was 5500 (on the polystyrene equivalent basis).

Synthesis Example 12

Synthesis of Polysiloxane Solution (x)

Into a 500 ml three-necked flask, 34.05 g (0.25 mol) of methyltrimethoxysilane, 19.83 g (0.10 mol) of phenyltrimethoxysilane, 26.23 g (0.10 mol) of 3-trimethoxysilylpropylsuccinic acid, 82.04 g (0.35 mol) of γ-acryloylpropyltrimethoxysilane, 54.87 g (0.20 mol on the silicon atom equivalent basis) of silica particles "PL-2L-DAA" (solid concentration 21.9% by weight, manufactured by FUSO CHEMICAL CO., LTD.), and 149.68 g of DAA were charged, and to the resulting mixture, an aqueous solution of phosphoric acid, which was obtained by dissolving 0.348 g (0.2% by weight with respect to the weight of charged monomers) of phosphoric acid in 45.0 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 45 g) as by-products were distilled during the reaction. DAA was added to the resulting DAA solution of polysiloxane so as to achieve a polymer concentration of 40% by weight to obtain a polysiloxane solution (x). The weight average molecular weight of the obtained polymer was measured by GPC, and consequently it was 5500 (on the polystyrene equivalent basis).

Synthesis Example 13

Synthesis of Polysiloxane Solution (xi)

Into a 500 ml three-necked flask, 54.48 g (0.40 mol) of methyltrimethoxysilane, 99.15 g (0.50 mol) of phenyltrimethoxysilane, 29.61 g (0.10 mol) of 2-(3,4-epoxycyclohexyl)ethyltrimethoxysilane, and 145.86 g of DAA were charged, and to the resulting mixture, an aqueous solution of phosphoric acid, which was obtained by dissolving 0.089 g (0.05% by weight with respect to the weight of charged monomers) of phosphoric acid in 55.8 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 120 g) as by-products were distilled during the reaction. DAA was added to the resulting DAA solution of polysiloxane so as to achieve a polymer concentration of 40% by weight to obtain a polysiloxane solution (xi). The weight average molecular weight of the obtained polymer was measured by GPC, and consequently it was 7500 (on the polystyrene equivalent basis).

Synthesis Example 14

Synthesis of Polysiloxane Solution (xii)

Into a 500 ml three-necked flask, 61.29 g (0.45 mol) of methyltrimethoxysilane, 39.66 g (0.20 mol) of phenyltrimethoxysilane, 86.94 g (0.35 mol) of γ-acryloylpropyltrimethoxysilane, and 173.44 g of DAA were charged, and to the resulting mixture, an aqueous solution of phosphoric acid, which was obtained by dissolving 0.376 g (0.2% by weight with respect to the weight of charged monomers) of phosphoric acid in 54.0 g of water, was added over 10 minutes by use of a dropping funnel while stirring the mixture with the flask immersed in an oil bath of 40° C. Then, when the mixture was heated and stirred under the same conditions as in Synthesis Example 3, methanol and water as by-products (in total, 110 g) were distilled during the reaction. DAA was added to the resulting DAA solution of polysiloxane so as to achieve a polymer concentration of 40% by weight to obtain a polysiloxane solution (xii). The weight average molecular weight of the obtained polymer was measured by GPC, and consequently it was 7500 (on the polystyrene equivalent basis).

Synthesis Example 15

Synthesis of Polysiloxane Solution (xiii)

Into a 500 ml three-necked flask, 30.65 g (0.225 mol) of methyltrimethoxysilane, 34.7 g (0.175 mol) of phenyltrimethoxysilane, 38.42 g (0.1 mol) of the carboxyl group-containing silane compound (A), and 95.78 g of DAA were charged, and to the resulting mixture, an aqueous solution of phosphoric acid, which was obtained by dissolving 0.208 g (0.2% by weight with respect to the weight of charged monomers) of phosphoric acid in 27.0 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 45 g) as by-products were distilled during the reaction. DAA was added to the resulting DAA solution of polysiloxane so as to achieve a polymer concentration of 40% by weight to obtain a polysiloxane solution (xiii). The weight average molecular weight of the obtained polymer was measured by GPC, and consequently it was 5500 (on the polystyrene equivalent basis).

Synthesis Example 16

Synthesis of Polysiloxane Solution (xiv)

Into a 500 ml three-necked flask, 13.621 g (0.10 mol) of methyltrimethoxysilane, 39.66 g (0.20 mol) of phenyltrimethoxysilane, 164.08 g (0.70 mol) of γ-acryloylpropyltrimethoxysilane, and 200.64 g of DAA were charged, and to the resulting mixture, an aqueous solution of phosphoric acid, which was obtained by dissolving 0.435 g (0.2% by weight with respect to the weight of charged monomers) of phosphoric acid in 54.0 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 110 g) as by-products were distilled during the reaction. DAA was added to the resulting DAA solution of polysiloxane so as to achieve a polymer concentration of 40% by weight to obtain a polysiloxane solution (xiv). The weight average molecular weight of the obtained polymer was measured by GPC, and consequently it was 7500 (on the polystyrene equivalent basis).

Synthesis Example 17

Synthesis of Polysiloxane Solution (xv)

Into a 500 ml three-necked flask, 81.72 g (0.60 mol) of methyltrimethoxysilane, 39.66 g (0.20 mol) of phenyltrimethoxysilane, 52.47 g (0.20 mol) of 3-trimethoxysilylpropylsuccinic acid, and 160.47 g of DAA were charged, and to the resulting mixture, an aqueous solution of phosphoric acid, which was obtained by dissolving 0.348 g (0.2% by weight with respect to the weight of charged monomers) of phosphoric acid in 57.60 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 100 g) as by-products were distilled during the reaction. DAA was added to the resulting DAA solution of polysiloxane so as to achieve a polymer concentration of 40% by weight to obtain a polysiloxane solution (xv). The weight average molecular weight of the obtained polymer was measured by GPC, and consequently it was 5500 (on the polystyrene equivalent basis).

Synthesis Example 18

Synthesis of Polysiloxane Solution (xvi)

Into a 500 ml three-necked flask, 47.67 g (0.35 mol) of methyltrimethoxysilane, 39.66 g (0.20 mol) of phenyltrimethoxysilane, 51.88 g (0.35 mol) of vinyltrimethoxysilane, 26.23 g (0.10 mol) of 3-trimethoxysilylpropylsuccinic acid, and 160.47 g of DAA were charged, and to the resulting mixture, an aqueous solution of phosphoric acid, which was obtained by dissolving 0.331 g (0.2% by weight with respect to the weight of charged monomers) of phosphoric acid in 55.80 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 100 g) as by-products were distilled during the reaction. DAA was added to the resulting DAA solution of polysiloxane so as to achieve a polymer concentration of 40% by weight to obtain a polysiloxane solution (xvi). The weight average molecular weight of the obtained polymer was measured by GPC, and consequently it was 5000 (on the polystyrene equivalent basis).

Synthesis Example 19

Synthesis of Polysiloxane Solution (xvii)

Into a 500 ml three-necked flask, 47.67 g (0.35 mol) of methyltrimethoxysilane, 39.66 g (0.20 mol) of phenyltrimethoxysilane, 78.52 g (0.35 mol) of styryltrimethoxysilane, 26.23 g (0.10 mol) of 3-trimethoxysilylpropylsuccinic acid, and 160.47 g of DAA were charged, and to the resulting mixture, an aqueous solution of phosphoric acid, which was obtained by dissolving 0.331 g (0.2% by weight with respect to the weight of charged monomers) of phosphoric acid in 55.80 g of water, was added over 10 minutes by use of a dropping funnel while stirring the mixture with the flask immersed in an oil bath of 40° C. Then, when the mixture was heated and stirred under the same conditions as in Synthesis Example 3, methanol and water (in total, 100 g) as by-products were distilled during the reaction. DAA was added to the resulting DAA solution of polysiloxane so as to achieve a polymer concentration of 40% by weight to obtain a polysiloxane solution (xvii). The weight average molecular weight of the obtained polymer was measured by GPC, and consequently it was 6000 (on the polystyrene equivalent basis).

Synthesis Example 20

Synthesis of Acrylic Resin Solution (a)

Into a 500 ml three-necked flask, 3 g of 2,2'-azobis(isobutyronitrile) and 50 g of propylene glycol methyl ether acetate (PGMEA) were charged. Thereafter, 30 g of methacrylic acid, 35 g of benzylmethacrylate, and 35 g of tricyclo [5.2.1.0$^{2,6}$]decan-8-yl methacrylate, and the resulting mixture was stirred at room temperature for a while, and the inside of the flask was replaced with nitrogen. Thereafter, the mixture was heated and stirred at 70° C. for 5 hours. Then, to the resulting solution, 15 g of glycidyl methacrylate, 1 g of dimethylbenzylamine, 0.2 g of p-methoxyphenol, and 100 g of PGMEA were added, and the resulting mixture was heated and stirred at 90° C. for 4 hours to obtain an acrylic resin solution (a). PGMEA was added to the obtained acrylic resin solution (a) so as to achieve a solid concentration of 40% by weight. The acrylic resin had the weight average molecular weight of 10000 and the acid value of 118 mg KOH/g.

The compositions of Synthesis Examples 3 to 20 are summarized in Table 1.

TABLE 1

| | | Organosilane compound having a carboxyl group (molar ratio) | Organosilane compound having a radical polymerizable group (molar ratio) |
|---|---|---|---|
| Synthesis Example 3 | polysiloxane solution (i) | carboxyl group-containing silane compound (A) (20) | gamma-acryloylpropyltrimethoxysilane (35) |
| Synthesis Example 4 | polysiloxane solution (ii) | carboxyl group-containing silane compound (B) (20) | gamma-acryloylpropyltrimethoxysilane (35) |
| Synthesis Example 5 | polysiloxane solution (iii) | 4-(trimethoxysilyl)butanoic acid (20) | gamma-acryloylpropyltrimethoxysilane (35) |
| Synthesis Example 6 | polysiloxane solution (iv) | 3-trimethoxysilylpropylsuccinic acid (10) | gamma-acryloylpropyltrimethoxysilane (35) |

TABLE 1-continued

| | | | |
|---|---|---|---|
| Synthesis Example 7 | polysiloxane solution (v) | 3-trimethoxysilylpropylsuccinic acid (4) | gamma-acryloylpropyltrimethoxysilane (35) |
| Synthesis Example 8 | polysiloxane solution (vi) | 3-trimethoxysilylpropylsuccinic acid (45) | gamma-acryloylpropyltrimethoxysilane (35) |
| Synthesis Example 9 | polysiloxane solution (vii) | 3-trimethoxysilylpropylsuccinic acid (10) | gamma-acryloylpropyltrimethoxysilane (5) |
| Synthesis Example 10 | polysiloxane solution (viii) | 3-trimethoxysilylpropylsuccinic acid (10) | gamma-acryloylpropyltrimethoxysilane (90) |
| Synthesis Example 11 | polysiloxane solution (ix) | 3-trimethoxysilylpropylsuccinic acid (10) | gamma-methacryloylpropyltrimethoxysilan (35) |
| Synthesis Example 12 | polysiloxane solution (x) | 3-trimethoxysilylpropylsuccinic acid (10) | gamma-acryloylpropyltrimethoxysilane (35) |
| Synthesis Example 13 | polysiloxane solution (xi) | — | — |
| Synthesis Example 14 | polysiloxane solution (xii) | — | gamma-acryloylpropyltrimethoxysilane (35) |
| Synthesis Example 15 | polysiloxane solution (xiii) | carboxyl group-containing silane compound (A) (20) | — |
| Synthesis Example 16 | polysiloxane solution (xiv) | — | gamma-acryloylpropyltrimethoxysilane (70) |
| Synthesis Example 17 | polysiloxane solution (xv) | 3-trimethoxysilylpropylsuccinic acid (20) | — |
| Synthesis Example 18 | polysiloxane solution (xvi) | 3-trimethoxysilylpropylsuccinic acid (10) | vinyltrimethoxysilane (35) |
| Synthesis Example 19 | polysiloxane solution (xvii) | 3-trimethoxysilylpropylsuccinic acid (10) | styryltrimethoxysilane (35) |
| Synthesis Example 20 | acrylic resin solution (a) | — | — |

| | Others (molar ratio) | | |
|---|---|---|---|
| Synthesis Example 3 | methyltrimethoxysilane (25) | phenyltrimethoxysilane (20) | — |
| Synthesis Example 4 | methyltrimethoxysilane (25) | phenyltrimethoxysilane (20) | — |
| Synthesis Example 5 | methyltrimethoxysilane (25) | phenyltrimethoxysilane (20) | — |
| Synthesis Example 6 | methyltrimethoxysilane (35) | phenyltrimethoxysilane (20) | — |
| Synthesis Example 7 | methyltrimethoxysilane (41) | phenyltrimethoxysilane (20) | — |
| Synthesis Example 8 | — | phenyltrimethoxysilane (20) | — |
| Synthesis Example 9 | methyltrimethoxysilane (65) | phenyltrimethoxysilane (20) | — |
| Synthesis Example 10 | — | — | — |
| Synthesis Example 11 | methyltrimethoxysilane (35) | phenyltrimethoxysilane (20) | — |
| Synthesis Example 12 | methyltrimethoxysilane (25) | phenyltrimethoxysilane (10) | PL-2L-DAA (20) |
| Synthesis Example 13 | methyltrimethoxysilane (40) | phenyltrimethoxysilane (50) | 2-(3,4-epoxycyclohexyl)ethyltrimethoxysilane (10) |
| Synthesis Example 14 | methyltrimethoxysilane (45) | phenyltrimethoxysilane (20) | — |
| Synthesis Example 15 | methyltrimethoxysilane (45) | phenyltrimethoxysilane (35) | — |
| Synthesis Example 16 | methyltrimethoxysilane (10) | phenyltrimethoxysilane (20) | — |
| Synthesis Example 17 | methyltrimethoxysilane (60) | phenyltrimethoxysilane (20) | — |
| Synthesis Example 18 | methyltrimethoxysilane (35) | phenyltrimethoxysilane (20) | — |
| Synthesis Example 19 | methyltrimethoxysilane (35) | phenyltrimethoxysilane (20) | — |
| Synthesis Example 20 | glycidyl methacrylate adduct of methacrylic acid-benzylmethacrylate-tricyclo[5.2.1.0$^{2.6}$]decan-8-yl methacrylate copolymer (100) | | |

Evaluation methods in each Example/Comparative Example will be described below.

(1) Measurement of Transmittance

The prepared siloxane resin composition was applied onto a Tempax glass substrate (manufactured by Asahi Techno Glass Corp.) (5 cm square) by spin coating under the conditions of rotating at 500 rpm for 10 seconds and then at 1000 rpm for 4 seconds using a spin coater (1H-360S manufactured by Mikasa Co., Ltd.), and then it was pre-baked at 90° C. for 2 minutes with a hot plate (SCW-636 manufactured by Dainippon Screen Mfg. Co., Ltd.) to prepare a film having a film thickness of 2 μm. The prepared film was exposed to light from an ultra high pressure mercury lamp as a light source using a parallel light mask aligner (hereinafter, referred to as PLA) (PLA-501F manufactured by Canon Inc.), and was cured at 220° C. for 1 hour in air using an oven (IHPS-222 manufactured by Tabai Espec Corp.) to prepare a cured film of 1.5 μm in thickness.

The transmittance at 400 nm of the obtained cured film was measured by use of UV-VIS Spectrophotometer UV-260 (manufactured by SHIMADZU Corp.). In addition, the film thickness was measured at a refractive index of 1.50 by use of Lambda Ace STM-602 manufactured by Dainippon Screen Mfg. Co., Ltd. The film thickness described below was measured similarly.

(2) Evaluation of Cracking Resistance

The cured film of 1.5 μm in thickness obtained by the method described in the paragraph (1) was further heated at 300° C. for 3 hours in air, and then two locations on the surface were observed with an optical microscope to check the presence or absence of cracks. Each location was rated on the following scale of 1 to 5, and the cured film, in which an average of the rated scales of two locations was 3.5 or more, was considered as an acceptance. The average scores are shown in Tables 4 and 5.

5: There is no crack in a film.
4: A crack is formed in one location of four corners of a substrate.
3: Cracks are formed in at least two and at most four locations of four corners of a substrate.
2: Cracks are formed in a peripheral portion of a substrate.
1: Cracks are formed throughout a substrate.

(3) Measurement of Hardness

The pencil hardness of the cured film of 1.5 μm in thickness obtained by the method described in the paragraph (1) was measured according to JIS K 5600-5-4 (1999).

(4) Evaluation of Abrasion Resistance

A cured film of 1.5 μm in thickness was prepared on a Tempax glass substrate having a size of 5 cm×7 cm by the same method as that described in the paragraph (1). Steel wool #0000 was moved to and fro ten times in a direction of the long side of the glass substrate on a cured film with a load of 1.96133 N applied thereonto, and then the presence or absence of flaws of the cured film was observed. The abrasion resistance of the cured film was rated on the following scale of 1 to 5 and the cured film of 4 or more was considered as an acceptance.

5: There is no flaw in a film.
4: There are 1 to 10 flaws in a film.
3: There are 11 to 30 flaws in a film.
2: There are 31 to 50 flaws in a film.
1: There are 51 or more flaws in a film.

(5) Evaluation of ITO Adhesion

A cured film of 1.5 μm in thickness was formed on a glass substrate with an ITO film thereon deposited by sputtering (hereinafter, referred to as an "ITO substrate") by the same method as that described in the paragraph (1), and the adhesion of the ITO to the cured film was evaluated according to JIS K 5400 8.5.2 (1990) Cross-cut tape method. 11 vertical parallel lines spaced 1 mm apart and 11 horizontal parallel lines spaced 1 mm apart, which were perpendicular to each other, were cut on the surface of the ITO on the glass substrate with a cutter in such a way that depths of these lines reached a base of the glass plate to prepare 100 squares having a size of 1 mm×1 mm. A cellophane adhesive tape (width: 18 mm, adhesive force: 3.7 N/10 mm) was stuck to the surface of the ITO parallel cut vertically and horizontally, and this tape was scrubbed with an eraser (passing JIS S 6050) to make the tape stick to the ITO, and then the tape was peeled off momentarily by manually pulling one end of the tape in a perpendicular direction to the plate. The number of squares remaining after peeling was then visually counted. The adhesion was rated according to the following criteria based on an area of peeled square, and the ITO adhesion of 4 or more was considered as an acceptance.

5: Peeled area is 0%.
4: Peeled area is more than 0% and 5% or less.
3: Peeled area is more than 5% and 15% or less.
2: Peeled area is more than 15% and 35% or less.
1: Peeled area is more than 35% and 65% or less.
0: Peeled area is more than 65% and 100% or less.
<0: All areas, including areas other than squares, were peeled.

(6) Pattern Processability (a) Sensitivity

The siloxane resin composition A was applied onto a silicon wafer by spin coating under the conditions of rotating at 500 rpm for 10 seconds and then at 1000 rpm for 4 seconds using a spin coater (1H-360S manufactured by Mikasa, Ltd.), and then it was pre-baked at 90° C. for 2 minutes with a hot plate (SCW-636 manufactured by Dainippon Screen Mfg. Co., Ltd.) to prepare a pre-baked film having a film thick of 2 μm. The pre-baked film obtained was exposed to light from an ultra high pressure mercury lamp as a light source through a 100 μm gap of a gray scale mask for sensitivity measurement using the PLA. Thereafter, the exposed film was developed by showering of ELM-D (manufactured by Mitsubishi Gas Chemical Co., Inc.), which is a 0.4% by weight aqueous solution of tetramethylammonium hydroxide, for 90 seconds using an automatic developing apparatus (AD-2000 manufactured by Takizawa Sangyo Co., Ltd.), and then rinsed with water for 30 seconds.

After the exposure and the development, an exposure amount (hereinafter, referred to as an optimum exposure amount) at which a 30 μm line and space pattern is formed at a width ratio of 1:1 was taken as the sensitivity. The exposure amount was measured by an i-line illuminometer.

(b) Resolution

A minimum pattern size after development at the optimum exposure amount was measured.

(c) Development Residue

After patterning was applied onto the silicon wafer by the method described in the paragraph (a), an extent of a non-exposed area left undissolved was rated according to the following criteria.

5: There is no area left undissolved in visual observation, and there is no residue in the fine patterns of 50 μm or less in a microscope observation.
4: There is no area left undissolved in visual observation, and in a microscope observation, there is no residue in the pattern larger than 50 μm but there is a residue in the pattern of 50 μm or less.
3: There is no area left undissolved in visual observation, but there is a residue in the pattern larger than 50 μm in a microscope observation.
2: There is an area left undissolved at a substrate end (thick film portion) in visual observation.
1: There are areas left undissolved throughout the non-exposed area in visual observation.

(7) ITO Heat Resistance

A cured film of 1.5 μm in thickness was formed on a glass substrate with an ITO film thereon deposited by sputtering (hereinafter, referred to as an "ITO substrate") in the same manner as in the paragraph (1), heated at 230° C. for 3 hours and at 250° C. for 3 hours in an oven, and evaluated based on the adhesion of the cured film. Evaluation criteria were similar to those in the paragraph (5).

Example 1

Under a yellow lamp, 0.5166 g of 2-methyl-[4-(methylthio)phenyl]-2-morpholinopropane-1-one (trade name "IRGACURE 907" manufactured by Ciba Specialty Chemicals K.K.) and 0.0272 g of 4,4-bis(diethylamino)benzophenone were dissolved in 2.9216 g of DAA and 2.4680 g of PGMEA, and to this, 2.7189 g of a 50 weight % PGMEA solution of dipentaerythritol hexaacrylate (trade name ""KAYARAD (registered trademark)" DPHA" manufactured by Nippon Kayaku Co., Ltd.), 2.7189 g of a 50 weight % PGMEA solution of 9,9-bis[4-(2-acryloyloxyethoxy)phenyl]fluorene (trade name "BPEFA" manufactured by Osaka Gas Chemicals Co., Ltd.), 1.6314 g of a 1 weight % PGMEA solution of 4-t-butylcatechol, 6.7974 g of the polysiloxane solution (i), and 0.2000 g (equivalent to a concentration of 100 ppm) of a 1 weight % PGMEA solution of BYK-333 (manufactured by BYK Japan KK) as a silicone-based surfactant were added, and the resulting mixture was stirred. Next, the mixture was separated by filtering with a filter with a pore size of 0.45 μm to obtain a siloxane resin composition A. Evaluations (transmittance, cracking resistance, hardness, abrasion resistance, ITO adhesion, ITO heat resistance and pattern processability) of the obtained siloxane resin composition A were carried out by the above-mentioned methods.

Example 2

A siloxane resin composition B was obtained in the same manner as in Example 1 except for using the polysiloxane solution (ii) in place of the polysiloxane solution (i). Evaluations of the obtained siloxane resin composition B were carried out in the same manner as in Example 1.

Example 3

A siloxane resin composition C was obtained in the same manner as in Example 1 except for using the polysiloxane solution (iii) in place of the polysiloxane solution (i). Evaluations of the obtained siloxane resin composition C were carried out in the same manner as in Example 1.

Example 4

A siloxane resin composition D was obtained in the same manner as in Example 1 except for using the polysiloxane solution (iv) in place of the polysiloxane solution (i). Evaluations of the obtained siloxane resin composition D were carried out in the same manner as in Example 1.

Example 5

A siloxane resin composition E was obtained in the same manner as in Example 1 except for using the polysiloxane solution (v) in place of the polysiloxane solution (i). Evaluations of the obtained siloxane resin composition E were carried out in the same manner as in Example 1.

Example 6

A siloxane resin composition F was obtained in the same manner as in Example 1 except for using the polysiloxane solution (vi) in place of the polysiloxane solution (i). Evaluations of the obtained siloxane resin composition F were carried out in the same manner as in Example 1.

Example 7

A siloxane resin composition G was obtained in the same manner as in Example 1 except for using the polysiloxane solution (vii) in place of the polysiloxane solution (i). Evaluations of the obtained siloxane resin composition G were carried out in the same manner as in Example 1.

Example 8

A siloxane resin composition H was obtained in the same manner as in Example 1 except for using the polysiloxane solution (viii) in place of the polysiloxane solution (i). Evaluations of the obtained siloxane resin composition H were carried out in the same manner as in Example 1.

Example 9

A siloxane resin composition I was obtained in the same manner as in Example 1 except for using the polysiloxane solution (ix) in place of the polysiloxane solution (i). Evaluations of the obtained siloxane resin composition I were carried out in the same manner as in Example 1.

Example 10

A siloxane resin composition J was obtained in the same manner as in Example 1 except for using the polysiloxane solution (x) in place of the polysiloxane solution (i). Evaluations of the obtained siloxane resin composition J were carried out in the same manner as in Example 1.

Example 11

A siloxane resin composition K was obtained in the same manner as in Example 1 except for using the polysiloxane solution (xvi) in place of the polysiloxane solution (i). Evaluations of the obtained siloxane resin composition K were carried out in the same manner as in Example 1.

Example 12

A siloxane resin composition L was obtained in the same manner as in Example 1 except for using the polysiloxane solution (xvii) in place of the polysiloxane solution (i). Evaluations of the obtained siloxane resin composition L were carried out in the same manner as in Example 1.

Example 13

Under a yellow lamp, 0.5166 g of 1-[4-(phenylthio)-2-(O-benzoyloxime)] (trade name "IRGACURE OXE-01" manufactured by Ciba Specialty Chemicals K.K.) was dissolved in 2.7279 g of DAA and 2.2622 g of PGMEA, and to this, 2.8481 g of a 50 weight % PGMEA solution of "DPHA", 2.8481 g of a 50 weight % PGMEA solution of "BPEFA", 1.7078 g of a 1 weight % PGMEA solution of 4-t-butylcatechol, 7.1201 g of the polysiloxane solution (iv), and 0.2000 g (equivalent to a concentration of 100 ppm) of a 1 weight % PGMEA solution of BYK-333 (manufactured by BYK Japan KK) as a silicone-based surfactant were added, and the resulting mixture was stirred. Next, the mixture was separated by filtering with a filter with a pore size of 0.45 μm to obtain a siloxane resin composition M. Evaluations of the obtained siloxane resin composition M were carried out in the same manner as in Example 1.

Example 14

Under a yellow lamp, 0.5166 g of 1-(O-acetyl oxime)-1-[9-ethyl-6-(2-methylbenzoyl)-9H-carbazole-3-yl]ethanone (trade name "IRGACURE OXE-02" manufactured by Ciba Specialty Chemicals K.K.) was dissolved in 2.6452 g of DAA and 2.1743 g of PGMEA, and to this, 2.6452 g of a 50 weight % PGMEA solution of "DPHA", 2.6452 g of a 50 weight % PGMEA solution of "BPEFA", 1.7419 g of a 1 weight % PGMEA solution of 4-t-butylcatechol, 7.2580 g of the polysiloxane solution (iv), and 0.2000 g (equivalent to a concentration of 100 ppm) of a 1 weight % PGMEA solution of BYK-333 (manufactured by BYK Japan KK) as a silicone-based surfactant were added, and the resulting mixture was stirred. Next, the mixture was separated by filtering with a filter with a pore size of 0.45 μm to obtain a siloxane resin composition N. Evaluations of the obtained siloxane resin composition N were carried out in the same manner as in Example 1.

Example 15

Under a yellow lamp, 0.4373 g of "IRGACURE 907" and 0.0230 g of 4,4-bis(diethylamino)benzophenone were dissolved in 0.2644 g of DAA and 3.1332 g of PGMEA, and to this, 2.3016 g of a 50 weight % PGMEA solution of "DPHA", 2.3016 g of a 50 weight % PGMEA solution of "BPEFA", 1.3810 g of a 1 weight % PGMEA solution of 4-t-butylcatechol, 5.7540 g of the polysiloxane solution (i), 4.2039 g of "PL-2L-DAA", and 0.2000 g (equivalent to a concentration of 100 ppm) of a 1 weight % PGMEA solution of "BYK-333" were added, and the resulting mixture was stirred. Next, the mixture was separated by filtering with a filter with a pore size of 0.45 μm to obtain a siloxane resin composition O. Evaluations of the obtained siloxane resin composition O were carried out in the same manner as in Example 1.

Example 16

A siloxane resin composition P was obtained in the same manner as in Example 13 except for using the polysiloxane solution (iii) in place of the polysiloxane solution (i). Evaluations of the obtained siloxane resin composition P were carried out in the same manner as in Example 1.

Example 17

A siloxane resin composition Q was obtained in the same manner as in Example 13 except for using the polysiloxane solution (iv) in place of the polysiloxane solution (i). Evaluations of the obtained siloxane resin composition Q were carried out in the same manner as in Example 1.

Example 18

A siloxane resin composition R was obtained in the same manner as in Example 13 except for using the polysiloxane solution (x) in place of the polysiloxane solution (i). Evaluations of the obtained siloxane resin composition R were carried out in the same manner as in Example 1.

Example 19

Under a yellow lamp, 0.5166 g of "IRGACURE 907" and 0.0272 g of 4,4-bis(diethylamino)benzophenone were dissolved in 2.9216 g of DAA and 2.4680 g of PGMEA, and to this, 2.7189 g of a 50 weight % PGMEA solution of "DPHA", 2.7189 g of a 50 weight % PGMEA solution of "BPEFA", 1.6314 g of a 1 weight % PGMEA solution of 4-t-butylcatechol, 3.3987 g of the polysiloxane solution (i), 3.3987 g of the polysiloxane solution (xi), and 0.2000 g (equivalent to a concentration of 100 ppm) of a 1 weight % PGMEA solution of BYK-333 (manufactured by BYK Japan KK) as a silicone-based surfactant were added, and the resulting mixture was stirred. Next, the mixture was separated by filtering with a filter with a pore size of 0.45 μm to obtain a siloxane resin composition S. Evaluations of the obtained siloxane resin composition S were carried out in the same manner as in Example 1.

Example 20

A siloxane resin composition T was obtained in the same manner as in Example 19 except for using the polysiloxane solution (iii) in place of the polysiloxane solution (i). Evaluations of the obtained siloxane resin composition T were carried out in the same manner as in Example 1.

Example 21

A siloxane resin composition U was obtained in the same manner as in Example 19 except for using the polysiloxane solution (iv) in place of the polysiloxane solution (i). Evaluations of the obtained siloxane resin composition U were carried out in the same manner as in Example 1.

Example 22

Under a yellow lamp, 0.5166 g of "IRGACURE 907" and 0.0272 g of 4,4-bis(diethylamino)benzophenone were dissolved in 2.9216 g of DAA and 2.4680 g of PGMEA, and to this, 5.4379 g of a 50 weight % PGMEA solution of "DPHA", 1.6314 g of a 1 weight % PGMEA solution of 4-t-butylcatechol, 6.7974 g of the polysiloxane solution (iv), and 0.2000 g (equivalent to a concentration of 100 ppm) of a 1 weight % PGMEA solution of BYK-333 (manufactured by BYK Japan KK) as a silicone-based surfactant were added, and the resulting mixture was stirred. Next, the mixture was separated by filtering with a filter with a pore size of 0.45 μm to obtain a siloxane resin composition V. Evaluations of the obtained siloxane resin composition V were carried out in the same manner as in Example 1.

Example 23

A siloxane resin composition W was obtained in the same manner as in Example 1 except for using the polysiloxane solution (iv) in place of the polysiloxane solution (i) and 9,9-bis[4-(2-acryloyloxypropoxy)phenyl]fluorene in place of the "BPEFA". Evaluations of the obtained siloxane resin composition W were carried out in the same manner as in Example 1.

Example 24

A siloxane resin composition X was obtained in the same manner as in Example 19 except for using the polysiloxane solution (iv) in place of the polysiloxane solution (i) and 9,9-bis[4-(2-acryloyloxypropoxy)phenyl]fluorene in place of the "BPEFA". Evaluations of the obtained siloxane resin composition X were carried out in the same manner as in Example 1.

Example 25

A siloxane resin composition Y was obtained in the same manner as in Example 22 except for using a mixture (trade name "T-PE-A" manufactured by KOEI CHEMICAL CO., Ltd.) of tripentaerythritol polyacrylate, tetrapentaerythritol polyacrylate and pentaerythritol polyacrylate in place of the "DPHA". Evaluations were carried out in the same manner as in Example 1 by use of the obtained siloxane resin composition Y.

Example 26

A siloxane resin composition Z was obtained in the same manner as in Example 1 except for using the polysiloxane solution (iv) in place of the polysiloxane solution (i) and "T-PE-A" in place of the "DPHA". Evaluations of the obtained siloxane resin composition Z were carried out in the same manner as in Example 1.

Example 27

A siloxane resin composition AA was obtained in the same manner as in Example 19 except for using the polysiloxane solution (iv) in place of the polysiloxane solution (i) and "T-PE-A" in place of the "DPHA". Evaluations of the obtained siloxane resin composition AA were carried out in the same manner as in Example 1.

Comparative Example 1

A siloxane resin composition I was obtained in the same manner as in Example 1 except for using the polysiloxane solution (xii) in place of the polysiloxane solution (i). Evaluations of the obtained siloxane resin composition I were carried out in the same manner as in Example 1.

Comparative Example 2

A siloxane resin composition II was obtained in the same manner as in Example 1 except for using the polysiloxane solution (xiii) in place of the polysiloxane solution (i). Evaluations of the obtained siloxane resin composition II were carried out in the same manner as in Example 1.

Comparative Example 3

Under a yellow lamp, 0.5166 g of "IRGACURE 907" and 0.0272 g of 4,4-bis(diethylamino)benzophenone were dissolved in 2.9216 g of DAA and 2.4680 g of PGMEA, and to this, 2.7189 g of a 50 weight % PGMEA solution of "DPHA", 2.7189 g of a 50 weight % PGMEA solution of "BPEFA", 1.6314 g of a 1 weight % PGMEA solution of 4-t-butylcatechol, 3.3987 g of the polysiloxane solution (xiv), 3.3987 g of the polysiloxane solution (xv), and 0.2000 g (equivalent to a concentration of 100 ppm) of a 1 weight % PGMEA solution of BYK-333 (manufactured by BYK Japan KK) as a silicone-based surfactant were added, and the resulting mixture was stirred. Next, the mixture was separated by filtering with a filter with a pore size of 0.45 μm to obtain a siloxane resin composition III. Evaluations of the obtained siloxane resin composition III were carried out in the same manner as in Example 1.

Comparative Example 4

An acrylic resin composition IV was obtained in the same manner as in Example 1 except for using the acrylic resin solution (a) in place of the polysiloxane solution (i) and PGMEA in place of the DAA. Evaluations of the obtained acrylic resin composition IV were carried out in the same manner as in Example 1.

The compositions of Examples 1 to 25 and Comparative Examples 1 to 4 are shown in Tables 2 and 3, and the results of evaluations are shown in Tables 4 and 5.

TABLE 2-1

|  | (A) Polysiloxane (wt % of polysiloxane) | (B) Photo-radical polymerization initiator (wt %) | (C) Compound including a radical polymerizable group (wt %) | (D) Metal compound particle (wt %) |
|---|---|---|---|---|
| Example 1 | polysiloxane solution (i) (13.6) | IRGACURE 907 (2.6) 4,4-bis(diethylamino)benzophenone (0.1) | DPHA (6.8) BPEFA (6.8) | — |
| Example 2 | polysiloxane solution (ii) (13.6) | IRGACURE 907 (2.6) 4,4-bis(diethylamino)benzophenone (0.1) | DPHA (6.8) BPEFA (6.8) | — |
| Example 3 | polysiloxane solution (iii) (13.6) | IRGACURE 907 (2.6) 4,4-bis(diethylamino)benzophenone (0.1) | DPHA (6.8) BPEFA (6.8) | — |
| Example 4 | polysiloxane solution (iv) (13.6) | IRGACURE 907 (2.6) 4,4-bis(diethylamino)benzophenone (0.1) | DPHA (6.8) BPEFA (6.8) | — |
| Example 5 | polysiloxane solution (v) (13.6) | IRGACURE 907 (2.6) 4,4-bis(diethylamino)benzophenone (0.1) | DPHA (6.8) BPEFA (6.8) | — |
| Example 6 | polysiloxane solution (vi) (13.6) | IRGACURE 907 (2.6) 4,4-bis(diethylamino)benzophenone (0.1) | DPHA (6.8) BPEFA (6.8) | — |
| Example 7 | polysiloxane solution (vii) (13.6) | IRGACURE 907 (2.6) 4,4-bis(diethylamino)benzophenone (0.1) | DPHA (6.8) BPEFA (6.8) | — |
| Example 8 | polysiloxane solution (viii) (13.6) | IRGACURE 907 (2.6) 4,4-bis(diethylamino)benzophenone (0.1) | DPHA (6.8) BPEFA (6.8) | — |
| Example 9 | polysiloxane solution (ix) (13.6) | IRGACURE 907 (2.6) 4,4-bis(diethylamino)benzophenone (0.1) | DPHA (6.8) BPEFA (6.8) | — |
| Example 10 | polysiloxane solution (x) (13.6) | IRGACURE 907 (2.6) 4,4-bis(diethylamino)benzophenone (0.1) | DPHA (6.8) BPEFA (6.8) | — |

TABLE 2-1-continued

| | | | | |
|---|---|---|---|---|
| Example 11 | polysiloxane solution (xvi) (13.6) | IRGACURE 907 (2.6) 4,4-bis(diethylamino)benzophenone (0.1) | DPHA (6.8) BPEFA (6.8) | — |
| Example 12 | polysiloxane solution (xvii) (13.6) | IRGACURE 907 (2.6) 4,4-bis(diethylamino)benzophenone (0.1) | DPHA (6.8) BPEFA (6.8) | — |
| Example 13 | polysiloxane solution (iv) (14.2) | IRGACURE OXE-01 (1.4) | DPHA (7.1) BPEFA (7.1) | — |
| Example 14 | polysiloxane solution (iv) (14.5) | IRGACURE OXE-02 (0.9) | DPHA (7.3) BPEFA (7.3) | — |

| | (E) Polysiloxane not having a carboxyl group (wt %) | Other polysiloxane (wt %) | Other additive (wt %, ppm) | Solvent (wt %) |
|---|---|---|---|---|
| Example 1 | — | — | t-butylcatechol (0.1) BYK-333 (100 ppm) | DAA (35) PGMEA (35) |
| Example 2 | — | — | t-butylcatechol (0.1) BYK-333 (100 ppm) | DAA(35) PGMEA(35) |
| Example 3 | — | — | t-butylcatechol (0.1) BYK-333 (100 ppm) | DAA(35) PGMEA(35) |
| Example 4 | — | — | t-butylcatechol (0.1) BYK-333 (100 ppm) | DAA(35) PGMEA(35) |
| Example 5 | — | — | t-butylcatechol (0.1) BYK-333 (100 ppm) | DAA(35) PGMEA(35) |
| Example 6 | — | — | t-butylcatechol (0.1) BYK-333 (100 ppm) | DAA(35) PGMEA(35) |
| Example 7 | — | — | t-butylcatechol (0.1) BYK-333 (100 ppm) | DAA(35) PGMEA(35) |
| Example 8 | — | — | t-butylcatechol (0.1) BYK-333 (100 ppm) | DAA(35) PGMEA(35) |
| Example 9 | — | — | t-butylcatechol (0.1) BYK-333 (100 ppm) | DAA(35) PGMEA(35) |
| Example 10 | — | — | t-butylcatechol (0.1) BYK-333 (100 ppm) | DAA(35) PGMEA(35) |
| Example 11 | — | — | t-butylcatechol (0.1) BYK-333 (100 ppm) | DAA(35) PGMEA(35) |
| Example 12 | — | — | t-butylcatechol (0.1) BYK-333 (100 ppm) | DAA(35) PGMEA(35) |
| Example 13 | — | — | t-butylcatechol (0.1) BYK-333 (100 ppm) | DAA(35) PGMEA(35) |
| Example 14 | — | — | t-butylcatechol (0.1) BYK-333 (100 ppm) | DAA(35) PGMEA(35) |

TABLE 2-2

| | (A) Polysiloxane (wt % of polysiloxane) | (B) Photo-radical polymerization initiator (wt %) | (C) Compound having a radical polymerizable group (wt %) | (D) Metal compound particle (wt %) |
|---|---|---|---|---|
| Example 15 | polysiloxane solution (i) (13.6) | IRGACURE 907 (2.2) 4,4-bis(diethylamino)benzophenone (0.1) | DPHA (6.8) BPEFA (6.8) | PL-2L-DAA (4.6) |
| Example 16 | polysiloxane solution (iii) (13.6) | IRGACURE 907 (2.2) 4,4-bis(diethylamino)benzophenone (0.1) | DPHA (6.8) BPEFA (6.8) | PL-2L-DAA (4.6) |
| Example 17 | polysiloxane solution (iv) (13.6) | IRGACURE 907 (2.2) 4,4-bis(diethylamino)benzophenone (0.1) | DPHA (6.8) BPEFA (6.8) | PL-2L-DAA (4.6) |
| Example 18 | polysiloxane solution (x) (13.6) | IRGACURE 907 (2.2) 4,4-bis(diethylamino)benzophenone (0.1) | DPHA (6.8) BPEFA (6.8) | PL-2L-DAA (4.6) |
| Example 19 | polysiloxane solution (i) (6.8) | IRGACURE 907 (2.6) 4,4-bis(diethylamino)benzophenone (0.1) | DPHA (6.8) BPEFA (6.8) | |
| Example 20 | polysiloxane solution (iii) (6.8) | IRGACURE 907 (2.6) 4,4-bis(diethylamino)benzophenone (0.1) | DPHA (6.8) BPEFA (6.8) | |
| Example 21 | polysiloxane solution (iv) (6.8) | IRGACURE 907 (2.6) 4,4-bis(diethylamino)benzophenone (0.1) | DPHA (6.8) BPEFA (6.8) | |
| Example 22 | polysiloxane solution (iv) (13.6) | IRGACURE 907 (2.6) 4,4-bis(diethylamino)benzophenone (0.1) | DPHA (13.6) | |
| Example 23 | polysiloxane solution (iv) (13.6) | IRGACURE 907 (2.6) 4,4-bis(diethylamino)benzophenone (0.1) | DPHA (6.8) 9,9-bis[4-(2-acryloyloxypropoxy)phenyl]fluorene (6.8) | |

TABLE 2-2-continued

| | | | | |
|---|---|---|---|---|
| Example 24 | polysiloxane solution (iv) (6.8) | IRGACURE 907 (2.6) 4,4-bis(diethylamino)benzophenone (0.1) | DPHA (6.8) 9,9-bis[4-(2-acryloyloxypropoxy)phenyl]fluorene (6.8) | — |
| Example 25 | polysiloxane solution (iv) (13.6) | IRGACURE 907 (2.6) 4,4-bis(diethylamino)benzophenone (0.1) | T-PE-A (13.6) | — |
| Example 26 | polysiloxane solution (iv) (13.6) | IRGACURE 907 (2.6) 4,4-bis(diethylamino)benzophenone (0.1) | T-PE-A (6.8) BPEFA (6.8) | — |
| Example 27 | polysiloxane solution (iv) (6.8) | IRGACURE 907 (2.6) 4,4-bis(diethylamino)benzophenone (0.1) | T-PE-A (6.8) BPEFA (6.8) | — |

| | (E) Polysiloxane not having a carboxyl group (wt %) | Other polysiloxane (wt %) | Other additive (wt %, ppm) | Solvent (wt %) |
|---|---|---|---|---|
| Example 15 | — | — | t-butylcatechol (0.1) BYK-333 (100 ppm) | DAA(35) PGMEA(35) |
| Example 16 | — | — | t-butylcatechol (0.1) BYK-333 (100 ppm) | DAA(35) PGMEA(35) |
| Example 17 | — | — | t-butylcatechol (0.1) BYK-333 (100 ppm) | DAA(35) PGMEA(35) |
| Example 18 | — | — | t-butylcatechol (0.1) BYK-333 (100 ppm) | DAA(35) PGMEA(35) |
| Example 19 | polysiloxane solution (xi) (6.8) | — | t-butylcatechol (0.1) BYK-333 (100 ppm) | DAA(35) PGMEA(35) |
| Example 20 | polysiloxane solution (xi) (6.8) | — | t-butylcatechol (0.1) BYK-333 (100 ppm) | DAA(35) PGMEA(35) |
| Example 21 | polysiloxane solution (xi) (6.8) | — | t-butylcatechol (0.1) BYK-333 (100 ppm) | DAA(35) PGMEA(35) |
| Example 22 | — | — | t-butylcatechol (0.1) BYK-333 (100 ppm) | DAA(35) PGMEA(35) |
| Example 23 | — | — | t-butylcatechol (0.1) BYK-333 (100 ppm) | DAA(35) PGMEA(35) |
| Example 24 | polysiloxane solution (xi) (6.8) | — | t-butylcatechol (0.1) BYK-333 (100 ppm) | DAA(35) PGMEA(35) |
| Example 25 | — | — | t-butylcatechol (0.1) BYK-333 (100 ppm) | DAA(35) PGMEA(35) |
| Example 26 | — | — | t-butylcatechol (0.1) BYK-333 (100 ppm) | DAA(35) PGMEA(35) |
| Example 27 | polysiloxane solution (xi) (6.8) | — | t-butylcatechol (0.1) BYK-333 (100 ppm) | DAA(35) PGMEA(35) |

TABLE 3

| | (A) Polysiloxane (wt % of polysiloxane) | (B) Photo-radical polymerization initiator (wt %) | (C) Compound having a radical polymerizable group (wt %) | (D) Metal compound particle (wt %) |
|---|---|---|---|---|
| Comparative Example 1 | — | IRGACURE 907 (2.6) 4,4-bis(diethylamino)benzophenone (0.1) | DPHA (6.8) BPEFA (6.8) | — |
| Comparative Example 2 | — | IRGACURE 907 (2.6) 4,4-bis(diethylamino)benzophenone (0.1) | DPHA (6.8) BPEFA (6.8) | — |
| Comparative Example 3 | — | IRGACURE 907 (2.6) 4,4-bis(diethylamino)benzophenone (0.1) | DPHA (6.8) BPEFA (6.8) | — |
| Comparative Example 4 | acrylic resin solution (a) (13.6) | IRGACURE 907 (2.6) 4,4-bis(diethylamino)benzophenone (0.1) | DPHA (6.8) BPEFA (6.8) | — |

| | (E) Polysiloxane not having a carboxyl group (wt %) | Other polysiloxane (wt %) | Other additive (wt %, ppm) | Solvent (wt %) |
|---|---|---|---|---|
| Comparative Example 1 | polysiloxane solution (xii) (13.6) | — | t-butylcatechol (0.1) BYK-333 (100 ppm) | DAA(35) PGMEA(35) |
| Comparative Example 2 | — | polysiloxane solution (xiii) (13.6) | t-butylcatechol (0.1) BYK-333 (100 ppm) | DAA(35) PGMEA(35) |
| Comparative Example 3 | polysiloxane solution (xiv) (6.8) | polysiloxane solution (xv) (6.8) | t-butylcatechol (0.1) BYK-333 (100 ppm) | DAA(35) PGMEA(35) |
| Comparative Example 4 | — | — | t-butylcatechol (0.1) BYK-333 (100 ppm) | PGMEA(70) |

TABLE 4-1

|  | Example 1 | Example 2 | Example 3 | Example 4 | Example 5 | Example 6 | Example 7 | Example 8 |
|---|---|---|---|---|---|---|---|---|
| Transmittance of cured film ($\lambda$ = 400 nm film thickness 1.5 μm) | 95.6% | 95.6% | 95.2% | 95.8% | 95.6% | 95.0% | 95.6% | 95.6% |
| Cracking resistance | 4.0 | 4.0 | 4.0 | 4.0 | 3.5 | 4.5 | 4.5 | 3.5 |
| ITO adhesion | 5 | 5 | 5 | 5 | 5 | 5 | 5 | 5 |
| Hardness | 5H | 5H | 5H | 5H | 5H | 5H | 4H | 6H |
| Abrasion resistance | 4 | 4 | 4 | 4 | 4 | 4 | 3 | 5 |
| Pattern processability — Sensitivity[mJ/cm2] | 60 | 60 | 70 | 60 | 60 | 80 | 80 | 40 |
| Pattern processability — Resolution [μm] | 10 | 10 | 8 | 8 | 50 | 3 | 6 | 15 |
| Pattern processability — Development residue | 5 | 5 | 5 | 5 | 4 | 5 | 5 | 5 |
| ITO heat resistance[230° C./3 h] | 4 | 4 | 4 | 4 | 4 | 3 | 4 | 3 |
| ITO heat resistance[250° C./3 h] | 1 | 0 | 1 | 0 | 0 | 0 | 0 | 0 |

|  | Example 9 | Example 10 | Example 11 | Example 12 | Example 13 | Example 14 |
|---|---|---|---|---|---|---|
| Transmittance of cured film ($\lambda$ = 400 nm film thickness 1.5 μm) | 95.2% | 96.1% | 94.9% | 96.1% | 97.5% | 94.5% |
| Cracking resistance | 5.0 | 5.0 | 3.5 | 5.0 | 4.0 | 4.0 |
| ITO adhesion | 5 | 5 | 5 | 5 | 5 | 5 |
| Hardness | 4H | 6H | 6H | 4H | 5H | 5H |
| Abrasion resistance | 4 | 4 | 5 | 4 | 4 | 4 |
| Pattern processability — Sensitivity[mJ/cm2] | 70 | 60 | 80 | 80 | 70 | 50 |
| Pattern processability — Resolution [μm] | 8 | 8 | 6 | 6 | 8 | 10 |
| Pattern processability — Development residue | 5 | 5 | 5 | 5 | 5 | 5 |
| ITO heat resistance[230° C./3 h] | 4 | 5 | 5 | 5 | 4 | 4 |
| ITO heat resistance[250° C./3 h] | 1 | 2 | 2 | 3 | 0 | 0 |

TABLE 4-2

|  | Example 15 | Example 16 | Example 17 | Example 18 | Example 19 | Example 20 | Example 21 |
|---|---|---|---|---|---|---|---|
| Transmittance of cured film ($\lambda$ = 400 nm film thickness 1.5 μm) | 96.2% | 96.1% | 96.1% | 96.5% | 95.8% | 95.6% | 95.3% |
| Cracking resistance | 5.0 | 5.0 | 5.0 | 5.0 | 4.0 | 4.0 | 4.5 |
| ITO adhesion | 5 | 5 | 5 | 5 | 5 | 5 | 5 |
| Hardness | 6H | 6H | 5H | 6H | 4H | 4H | 4H |
| Abrasion resistance | 4 | 4 | 4 | 4 | 4 | 4 | 4 |
| Pattern processability — Sensitivity[mJ/cm2] | 60 | 70 | 70 | 70 | 60 | 60 | 60 |
| Pattern processability — Resolution [μm] | 8 | 10 | 10 | 10 | 8 | 8 | 9 |
| Pattern processability — Development residue | 5 | 5 | 5 | 5 | 5 | 5 | 5 |
| ITO heat resistance[230° C./3 h] | 5 | 5 | 5 | 5 | 5 | 5 | 5 |
| ITO heat resistance[250° C./3 h] | 2 | 2 | 2 | 2 | 5 | 5 | 5 |

|  | Example 22 | Example 23 | Example 24 | Example 25 | Example 26 | Example 27 |
|---|---|---|---|---|---|---|
| Transmittance of cured film ($\lambda$ = 400 nm film thickness 1.5 μm) | 95.0% | 95.3% | 95.1% | 95.1% | 95.4% | 96.3% |
| Cracking resistance | 3.5 | 4.5 | 4.5 | 3.5 | 4.5 | 45 |
| ITO adhesion | 5 | 5 | 5 | 5 | 5 | 5 |
| Hardness | 7H | 5H | 4H | 8H | 6H | 5H |
| Abrasion resistance | 5 | 4 | 4 | 5 | 5 | 4 |
| Pattern processability — Sensitivity[mJ/cm2] | 40 | 70 | 70 | 35 | 60 | 70 |
| Pattern processability — Resolution [μm] | 15 | 7 | 7 | 20 | 9 | 7 |
| Pattern processability — Development residue | 5 | 5 | 5 | 5 | 5 | 5 |
| ITO heat resistance[230° C./3 h] | 1 | 5 | 5 | 3 | 4 | 5 |
| ITO heat resistance[250° C./3 h] | 0 | 3 | 5 | 0 | 1 | 5 |

TABLE 5

|  | Comparative Example 1 | Comparative Example 2 | Comparative Example 3 | Comparative Example 4 |
|---|---|---|---|---|
| Transmittance of cured film ($\lambda$ = 400 nm film thickness 1.5 μm) | 95.9% | 95.0% | 95.0% | 96.0% |
| Cracking resistance | 4.0 | 5.0 | 4.0 | 4.5 |
| ITO adhesion | 5 | 5 | 5 | 3 |

TABLE 5-continued

|  | | Comparative Example 1 | Comparative Example 2 | Comparative Example 3 | Comparative Example 4 |
|---|---|---|---|---|---|
| Hardness | | 5H | 3H | 4H | 3H |
| Abrasion resistance | | 4 | 3 | 3 | 3 |
| Pattern Processability | Sensitivity[mJ/cm2] | non-exposed area undissolved | 80 | 55 | 55 |
| | Resolution [μm] | — | 5 | 10 | 8 |
| | Development residue | 1 | 5 | 5 | 5 |
| ITO heat resistance[230° C./3 h] | | 5 | 5 | 5 | <0 |
| ITO heat resistance[250° C./3 h] | | 5 | 3 | 1 | <0 |

The cured film obtained by curing the siloxane resin composition can be used for various hard coating films such as a protective film for a touch panel, an insulation film for a touch sensor, and a planarization film for a TFT, an insulation film, an antireflection film, an optical filter, an overcoat for a color filter and a column material of a liquid crystal display and an organic EL display.

The invention claimed is:

1. A siloxane resin composition comprising:

(A) polysiloxane obtained from an organosilane comprising at least one carboxyl group, a radical polymerizable group, and wherein the organosilane is selected from the group consisting of Formula (2), Formula (3), Formula (7), Formula (8), Formula (9), and Formula (10):

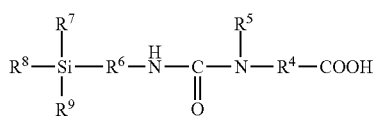
(2)

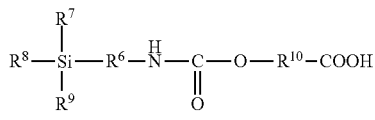
(3)

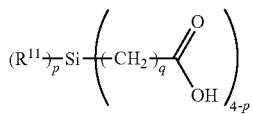
(7)

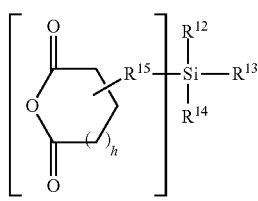
(8)

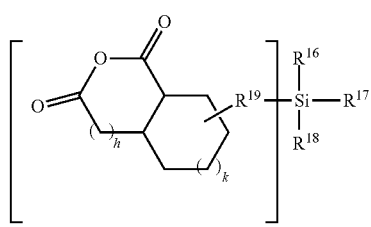
(9)

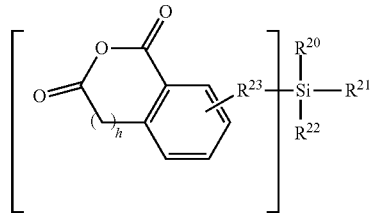
(10)

wherein $R^4$, $R^6$ and $R^{10}$ are divalent organic groups having 1 to 20 carbon atoms;

$R^5$ is a hydrogen atom or an alkyl group having 1 to 3 carbon atoms;

$R^7$, $R^8$, $R^9$ are each an alkyl group having 1 to 6 carbon atoms, an alkoxy group having 1 to 6 carbon atoms, a phenyl group, a phenoxy group, an alkylcarbonyloxy group having 2 to 6 carbon atoms, or substitution products thereof, and at least one of $R^7$, $R^8$, $R^9$ is an alkoxy group, a phenoxy group or an acetoxy group;

$R^{11}$ is an alkyl group having 1 to 6 carbon atoms, an alkoxy group having 1 to 6 carbon atoms, a phenyl group, a phenoxy group, an alkylcarbonyloxy group having 2 to 6 carbon atoms, or substitution products thereof, wherein $R^{11}$ comprises a plurality of units which may be the same or different and at least one unit is an alkoxy group, a phenoxy group or an acetoxy group, and wherein P represents an integer of 1 to 3 and q represents an integer of 2 to 20;

$R^{12}$, $R^{13}$, $R^{14}$, $R^{16}$, $R^{17}$, $R^{18}$, $R^{20}$, $R^{21}$, $R^{22}$ are each an alkyl group having 1 to 6 carbon atoms, an alkoxy group having 1 to 6 carbon atoms, a phenyl group, a phenoxy group, an alkylcarbonyloxy group having 2 to 6 carbon atoms, or substitution products thereof;

$R^{15}$, $R^{19}$ and $R^{23}$ are each a single bond or a chain aliphatic hydrocarbon group, a cyclic aliphatic hydrocarbon group, a carbonyl group, an ether group, an ester group, an amide group, an aromatic group, or a divalent group having any thereof, wherein any of these groups may be substituted, and wherein h and k represent each an integer of 0 to 3; and (B) a photo-radical polymerization initiator and (C) a compound having a radical polymerizable group and not having a Si—O—Si bond.

2. The siloxane resin composition according to claim 1, wherein the radical polymerizable group in (A) said polysiloxane is a (meth)acryloyl group.

3. The siloxane resin composition according to claim 1, wherein (A) said polysiloxane is polysiloxane obtained by hydrolyzing organosilane compounds containing an organosilane compound having a carboxyl group and/or a dicarboxylic anhydride group, and an organosilane compound having a radical polymerizable group, and condensing the hydrolysate.

4. The siloxane resin composition according to claim 1, wherein (C) said compound is a compound represented by the general formula (1):

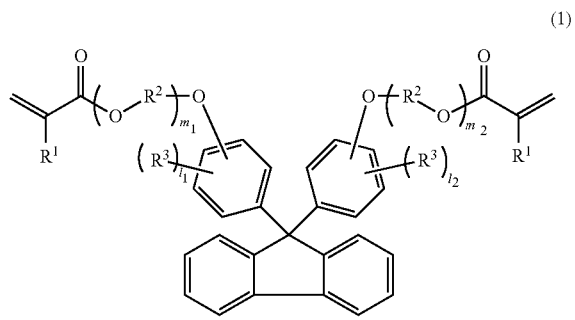

in which $R^1$ represents hydrogen or a methyl group, $R^2$ represents a linear or a branched alkylene group, $R^3$ represents an organic group having 1 to 20 carbon atoms, $l_1$ and $l_2$ represent an integer of 0 to 4 and may be the same or different, and $m_1$ and $m_2$ represent an integer of 1 to 20 and may be the same or different.

5. The siloxane resin composition according to claim 1, wherein (C) said compound is a compound having at least one radical polymerizable group selected from the group consisting of tripentaerythritol poly(meth)acrylate, tetrapentaerythritol poly(meth)acrylate and pentapentaerythritol poly(meth)acrylate.

6. The siloxane resin composition according to claim 1, wherein (A) said polysiloxane is polysiloxane obtained by hydrolyzing organosilane compounds containing an organosilane compound having a carboxyl group and/or a dicarboxylic anhydride group, and an organosilane compound having a radical polymerizable group in the presence of metal compound particles, and condensing the hydrolysate.

7. The siloxane resin composition according to claim 1, further containing (D) metal compound particles.

8. The siloxane resin composition according to claim 1, further containing (E) polysiloxane not having a carboxyl group.

9. A protective film for a touch panel obtained by curing the siloxane resin composition according to claim 1.

10. The protective film for a touch panel according to claim 9, wherein the pencil hardness measured according to JIS K 5600-5-4 (1999) is 4H or more per 1.5 μm of the thickness of the cured film.

* * * * *